(12) United States Patent
Widrow

(10) Patent No.: US 7,187,907 B2
(45) Date of Patent: Mar. 6, 2007

(54) SIMULTANEOUS TWO-WAY TRANSMISSION OF INFORMATION SIGNALS IN THE SAME FREQUENCY BAND

(76) Inventor: Bernard Widrow, 860 Lathrop Dr., Stanford, CA (US) 94305

( * ) Notice: Subject to any disclaimer, the term of this patent is extended or adjusted under 35 U.S.C. 154(b) by 1052 days.

(21) Appl. No.: 09/852,469

(22) Filed: May 9, 2001

(65) Prior Publication Data

US 2002/0032004 A1 Mar. 14, 2002

Related U.S. Application Data

(60) Provisional application No. 60/202,974, filed on May 9, 2000.

(51) Int. Cl.
*H04B 1/38* (2006.01)
*H04M 1/00* (2006.01)

(52) U.S. Cl. .................. 455/73; 455/562.1; 455/282; 455/3.05

(58) Field of Classification Search ............... 455/3.05, 455/7, 15, 13.1, 16, 279.1, 559, 523, 114.3, 455/144, 197.1, 242.1, 282, 73; 379/1.03, 379/1.04, 4, 93.01, 338, 12; 375/318, 222, 375/211, 220, 225, 240.15, 244, 297; 359/636, 359/722

See application file for complete search history.

(56) References Cited

U.S. PATENT DOCUMENTS 5,392,148 A * 2/1995 Takahashi et al. ......... 398/128
5,812,933 A * 9/1998 Niki ............................ 455/16
5,999,901 A * 12/1999 Knittle et al. ............... 704/233
6,069,879 A * 5/2000 Chatter ....................... 370/295
6,154,524 A * 11/2000 Bremer .................... 379/10.03
6,480,699 B1 * 11/2002 Lovoi ........................ 455/41.2
6,563,931 B1 * 5/2003 Soli et al. ................... 381/318
2002/0080066 A1 * 6/2002 Dent ........................... 342/373

* cited by examiner

*Primary Examiner*—Quochien B. Vuong
*Assistant Examiner*—Dominic E. Rego
(74) *Attorney, Agent, or Firm*—Perkins Coie LLP

(57) ABSTRACT

This invention provides designs for communication systems that use adaptive filters in circuits whose purpose is to enable two-way transmission of information signals in the same frequency band at the same time over twisted pair channels, coaxial cable channels, fiber optic channels, or wireless channels. The methodology allows two-way DSL transmission over telephone lines, making use of existing DSL hardware and signal standards, so that the upload speed is increased by an approximate factor of ten. Applied to wireless systems with single antennas at the two ends of the channel, a doubling of the data rate is achieved for a given bandwidth. Applied to wireless systems with 2-way adaptive antenna arrays at a central location and a 2-way adaptive antenna array at each of a plurality of subscriber locations, the data rate for a given bandwidth is increased by a large factor.

7 Claims, 24 Drawing Sheets

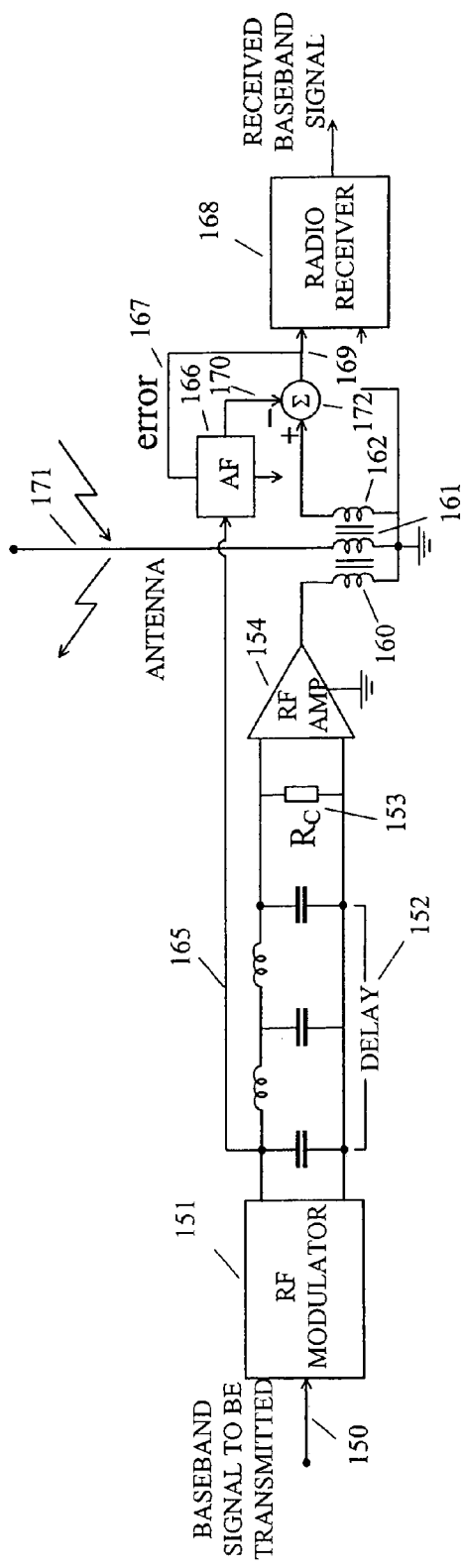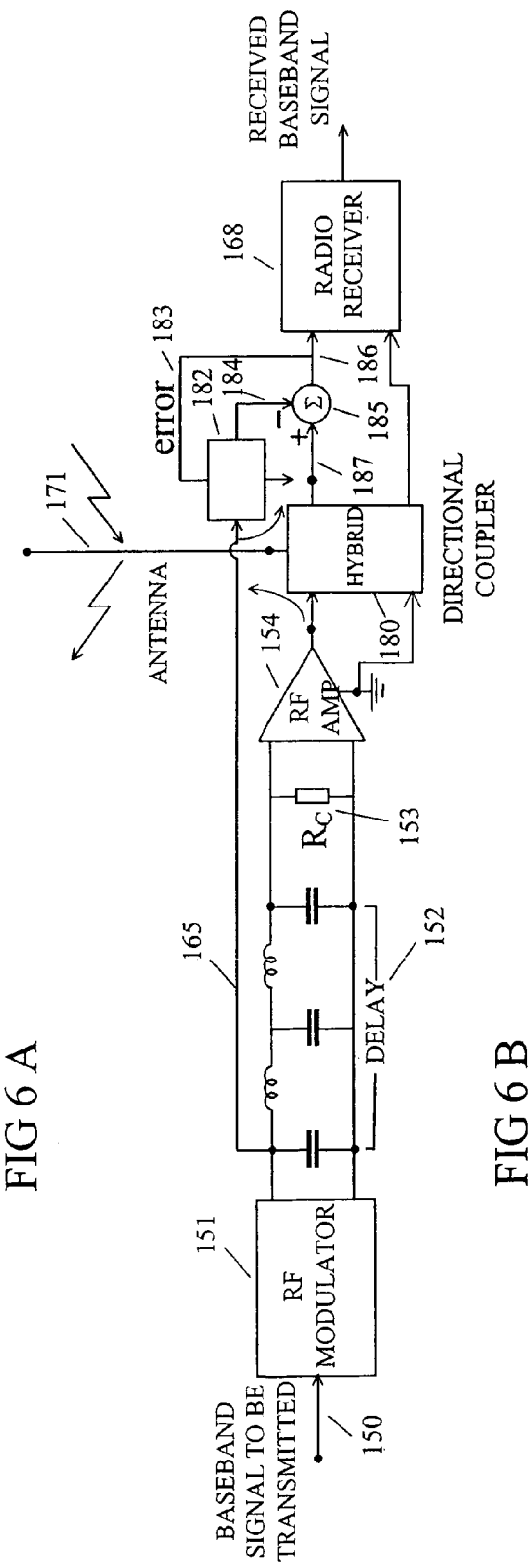
FIG 6 A
FIG 6 B

HIGH = HIGH FREQUENCY, HIGH BANDWIDTH BITSTREAM
LOW = LOW FREQUENCY, LOW BANDWIDTH BITSTREAM

SIMULTANEOUS TWO-WAY TRANSMISSION OF INFORMATION SIGNALS IN THE SAME FREQUENCY BAND

RELATED APPLICATIONS

This application claims priority to Provisional Application Ser. No. 60/202,974 filed May 9, 2000.

FIELD OF THE INVENTION

This invention relates generally to the field of telecommunications, and more particularly to the use of adaptive filters in circuits which enable two-way transmission of information signals in the same frequency band at the same time over twisted pair channels, coaxial cable channels, fiber optic channels, and wireless channels.

BACKGROUND OF THE INVENTION

At the present time, transmission of information via the Internet, whether digital data, digital audio, digital video, or other forms of data signals, is vital to the world's business.

These signals are carried by twisted-pair cable, coaxial cable, filter optic cable, or by wireless radio or satellite communication links. These channels may be narrow-band or wide-band. In addition to the Internet, there are many other forms of electronics communication channels, both analog and digital.

For many applications, there is need for two-way simultaneous communication. Currently, this is done by separating the inbound and outbound signals by placing them in different frequency bands. In order to conserve bandwidth and increase channel capacity, this invention provides means for two-way transmission of information signals in the same channel, in the same frequency band, at the same time.

Bi-directional amplification and communication systems have been proposed in the prior art. Separating inbound and outbound signals by placing them in separate frequency bands is commonly done (see for example U.S. Pat. No. 5,365,368). Separation of inbound and outbound signals by transmitting them at mutually exclusive times for radar and television applications is taught by U.S. Pat. Nos. 5,105,166 and 4,714,959. In microwave radio systems, separation can be achieved by utilizing horizontal and vertical polarizations for inbound and outbound radiation (see U.S. Pat. No. 5,481,223). This approach is workable, except for transmission through multipath where horizontal and vertical polarization components would become mixed. A different approach is taken by U.S. Pat. No. 5,119,365, which shows means for cancellation of transmitted signal components that leak into the received signal path at the head end of a bi-directional wire or cable communication line. Further along this direction, U.S. Pat. No. 5,187,803 shows a means for cancellation of transmitted signal components that leak into the received signal path within a bi-directional amplifier located in the middle of a two-way wire or cable communication line. The problem with the prior-art cancellation methods is that they depend critically on analog circuits whose component values must be adjusted, tuned, and balanced to create cancellation. There is no automatic means for initial tuning or for maintaining balance over time in the presence of line and component impedance changes, generally due to temperature changes and ageing.

Limitations of the prior art are overcome by the methods of this invention. Inbound and outbound signals are separated by means of cancellation techniques, which are based on adaptive filtering. Learning and self-adaptive circuits are used in combinations to make initial tuning for cancellation automatic, and to continually and automatically maintain the circuit balance necessary for separation of inbound and outbound signals.

OBJECTS AND SUMMARY OF THE INVENTION

It is an object of this invention to provide designs for components of communication systems that allow simultaneous two-way signal and data transmission over the same transmission channel, in the same band of frequencies. These components include two-way terminal devices for the ends of the transmission channel. On each end, they connect to sources of signal to be transmitted into the channel, and they separately connect to receivers of signal arriving from the channel. Also included are two-way repeater amplifiers that may be inserted into the channel at various distances, if required, to compensate for transmission losses. Included in addition are line tap circuits that allow "T" connections to the transmission channel. Also included are schemes for interconnection of three or more transmission lines with various paths and directions for information flow. For wireless channels, circuits are provided for full duplex operation in the same frequency band. Channel capacity with multiple users can be greatly increased by incorporating adaptive antenna arrays for transmission and reception in the same frequency band. Fiber-optic data transmission systems are described for two-way transmission which include 2-way terminus devices for the ends of the channel and 2-way repeater amplifiers, as may be required, to compensate for signal loss. These systems afford multiple wavelength transmission and they incorporate repeater amplifiers whose data signal paths are all optical or optical and electronic. These and other circuits for two-way communication systems are provided. They all make use of adaptive filters.

BRIEF DESCRIPTION OF THE DRAWINGS

The foregoing and other objects of the invention will be more clearly understood from the following detailed description when read in conjunction with the accompanying drawings, wherein:

FIGS. 6A–6B show two-way radio systems capable of transmitting and receiving simultaneously with the same antenna in the same frequency band.

DESCRIPTION OF THE PREFERRED EMBODIMENT

Figure 1:
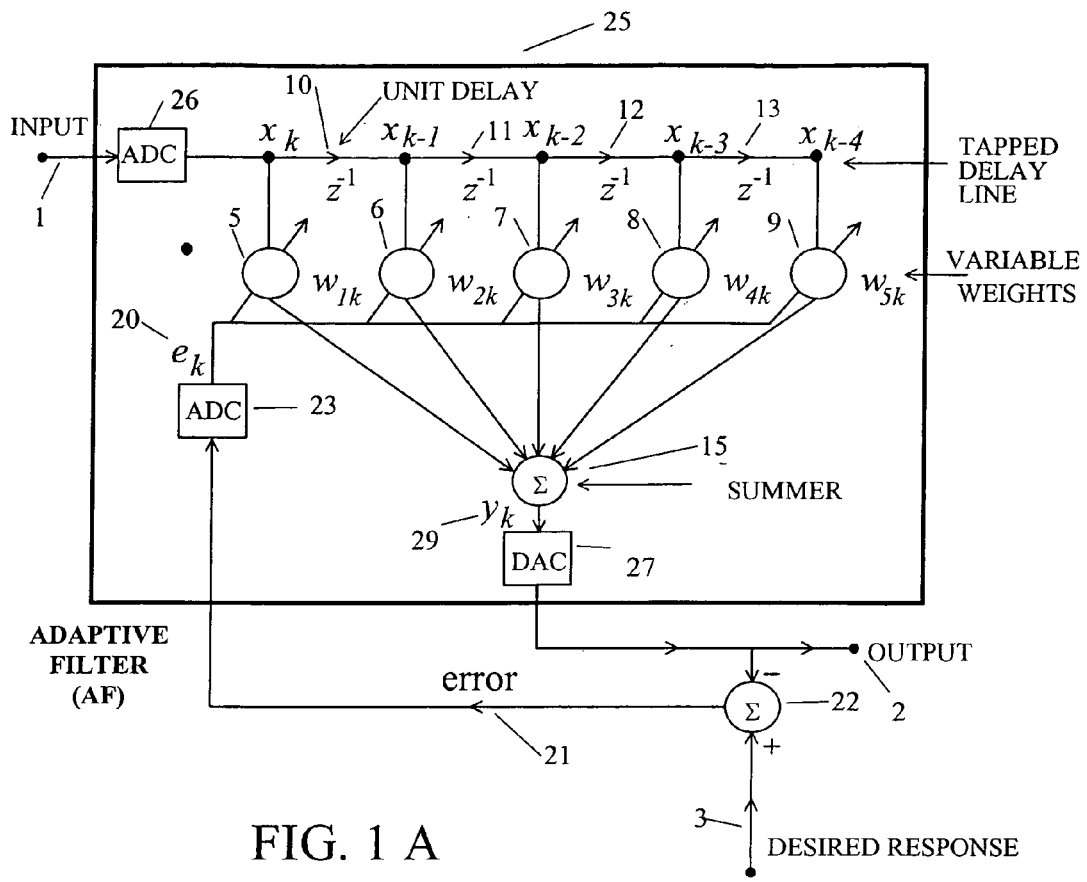
FIGS. 1A–1B show an adaptive filter of the type used with the invention, and a functional representation of it.
Figure 1:
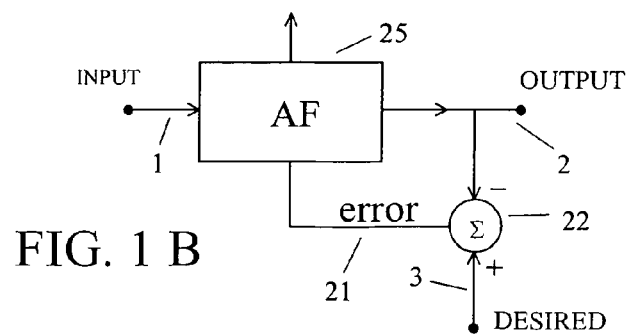

FIGS. 1A and 1B show an adaptive filter of the type used in the present invention. This filter has an input signal 1, and output signal 2, and a special input called the "error" 21. The impulse response of the filter is variable. This impulse response is controlled by a set of variable coefficients or "weights", $w_{1k}$, 5, $w_2$, 6, . . . The values of the weights, in turn, are controlled by an adaptive algorithm whose purpose is to find the best combination of weight values so that the mean square of the error is minimized. The weights are shown as circles, and the arrows through them represent their variability. In FIG. 1B, a functional diagram of the adaptive filter is shown, with an input and an output like a conventional filter, but with the special error input shown as an arrow through the adaptive filter indicating the variability of the filter with the purpose of minimizing the error.

Referring now to FIG. 1A, the input is digitized by an analog-to-digital converter (ADC) 26, and then fed to a tapped delay line. Unit delays are 10, 11, 12, . . . , and they are designated by $z^{-1}$, which is standard in the field of digital signal processing. The input signal at the first tap is $x_k$, the signal at the second tap is $x_{k-1}$, and so forth. The set of signals at all the taps is represented by the vector $X_k$.

$$X_k = \begin{bmatrix} x_k \\ x_{k-1} \\ \vdots \\ x_{k-n+1} \end{bmatrix}.$$

These signals are multiplied by or weighted by the weights $w_{1k}$, $w_{2k}$, . . . The weight vector is represented by $$W_k = \begin{bmatrix} w_{1k} \\ w_{2k} \\ \vdots \\ w_{nk} \end{bmatrix}.$$

The number of weights is n. The ADC 26 samples the input regularly in time, and the time index or sample time number is k.

The weighted signals are summed by the summer 15 to provide a weighted sum signal $y_k$, 29. The weighted sum $y_k$ can be written as the inner product of the input signal vector and the weight vector. That is, $$y_k = X_k^T W_k.$$

The filter output signal 2 is obtained from $y_k$ by digital-to-analog conversion, by DAC 27. The DAC includes an analog low pass filter, so that output 2 is a continuous signal.

A desired response signal 3 is generally supplied as a training signal. Subtracting the filter output signal 2 from the desired response 3 gives an error signal 21, that is used by the adaptive algorithm to train or adapt the weights. The error signal 21 is digitalized by the ADC 28 to form the discrete error signal $e_k$, 20 for the adaptive algorithm. The mean square of the error is known to be a quadratic function of the weights. This function has a global minimum and no local minima. The method of steepest descent is generally used to iteratively find the global optimum.

The most widely used adaptive algorithm in the world is the LMS algorithm of Widrow and Hoff (see B. Widrow and S. D. Steams, "Adaptive Signal Processing", New Jersey: Prentice-Hall, Inc., 1985, incorporated herein by reference). This algorithm was invented in 1959 and patented by B.

Figure 7:
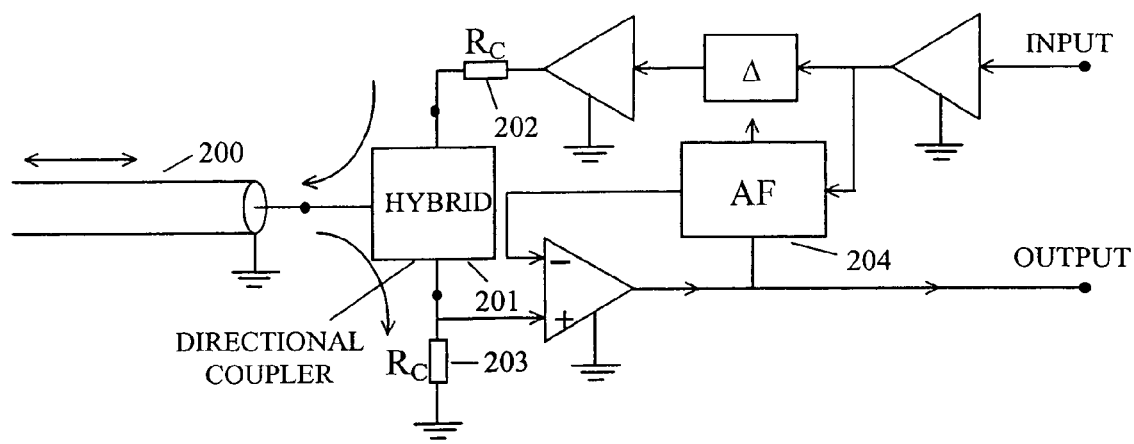
FIGS. 7A–7B show a 2-way terminus utilizing an adaptive filter in conjunction with a directional coupler, and a functional representation of this terminus.
Figure 7:
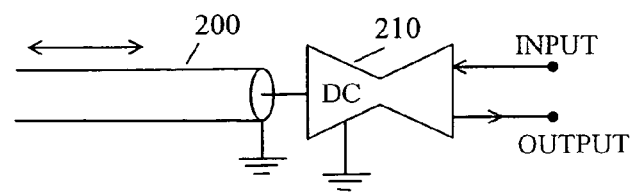
Figure 8:
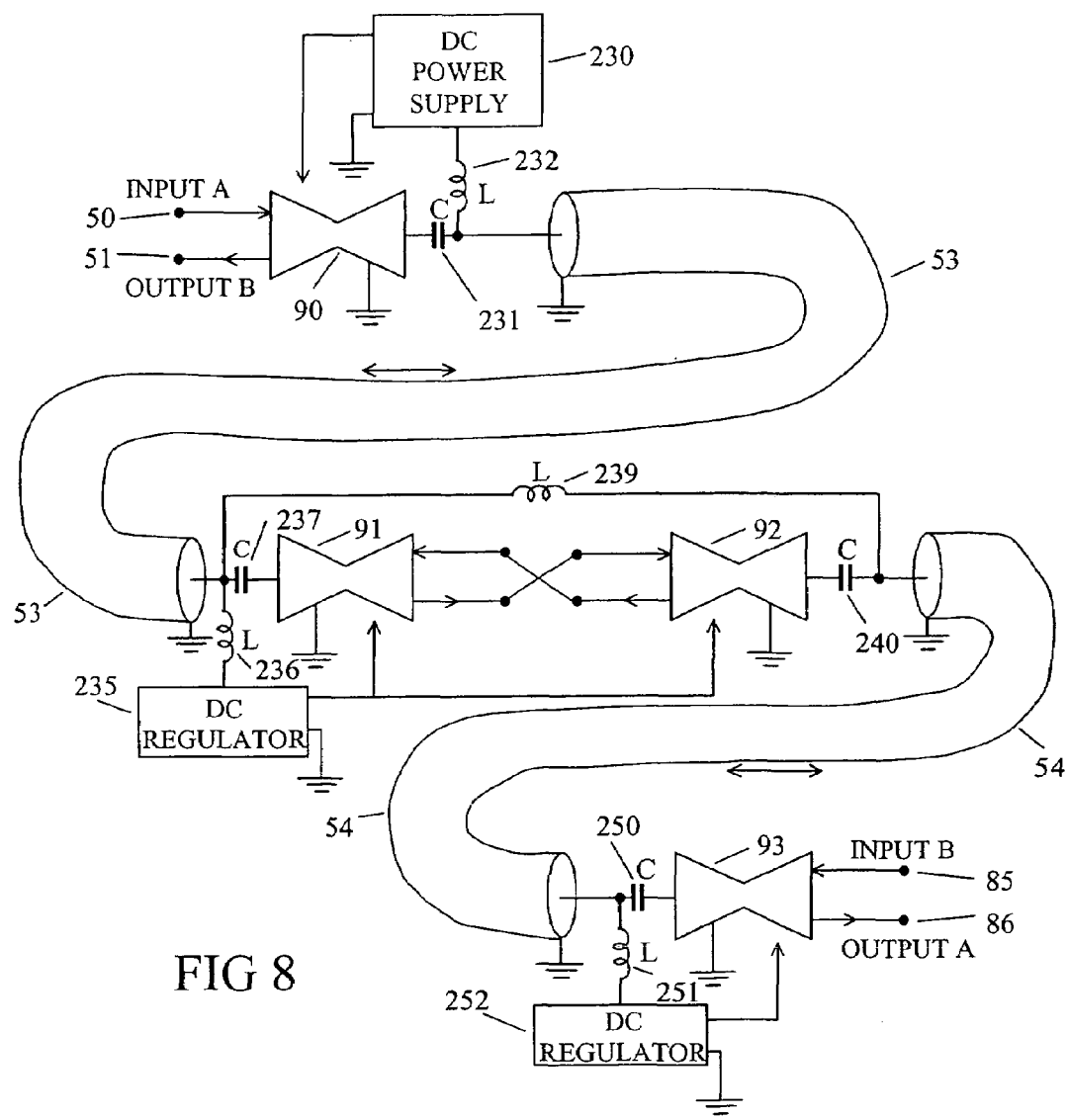
FIG. 8 shows a two-way signal and data transmission system with means for supplying DC power over the transmission line for the 2-way terminus devices and for the 2-way repeater amplifier.

Widrow and M. E. Hoff, Jr. under U.S. Pat. No. 3,222,654. It is an iterative algorithm, based on the method of steepest descent and is given by $$W_{k+1}=W_k+2\mu e_k X_k,$$

where $e_k=d_k-y_k$. The parameter $\mu$ is chosen to control rate of convergence and stability. This algorithm causes the weight vector to converge in the mean to a Wiener solution, the best linear least squares solution W*, given by $$W^*=R^{-1}P,$$

where $R=E[x_k x_k^T]$ and $P=E[d_k x_k^T]$. The algorithm is stable as long as 1>$\mu$ traceR>0. This is the condition for convergence of the variance of the weight vector. Various proofs of convergence and formulas for speed of convergence are given in the literature. Typical convergence time of the adaptive filter is a number of sample periods equal to ten times the number of weights n, or about ten times the length of the filter impulse response. Many algorithms other than LMS exist for adapting the weights and can be used with the present invention. The literature is extensive. An excellent summary is given by S. Haykin, "Adaptive Filter Theory", Third Edition, Prentice-Hall, Englewood Cliffs, N.J., 1996, incorporated herein by reference. This books describes the recursive least squares algorithm (RLS) which is often used to adapt an adaptive filter having a lattice architecture The adaptive filter of FIG. 1B has an analog interface in that it accepts an analog (continuous) input 1, and produces an analog (continuous) output 2. The adaptive filter of FIG. 1A converts the analog input to digital form, and converts its digital output $y_k$, 29, into analog form. The sampling rate of the adaptive filter should be the Nyquist rate, or preferably several times that, for the signals flowing through it. The filter of FIG. 1A could be built to directly accept an analog input however, and then the ADC's 26, and 28, and DAC 27 could be eliminated. The tapped delay line could be an analog delay line. An example is a surface acoustic wave device (SAW). The LMS algorithm can be implemented in continuous form. A way to do this is shown in B. Widrow et. al., "Adaptive Antennas Systems", Proceedings of the IEEE, Vol. 55, No. 12, December, 1967, pp 2143–2159, incorporated herein by reference. The analog form of the LMS algorithm is illustrated in FIGS. 7 and 8, page 2149.

An analog-input analog-output type of adaptive filter is desirable for inclusion in most of the circuits of the present invention. If, however, the input to the adaptive filter is already in digital form, and a digital output is desired, then ADC's 26 and 27 and DAC 27 can be eliminated. The sampling rate of the data signals flowing through the adaptive filter would need to be synchronized with the clock rate of the adaptive filter itself, however.

Figures 2A, 2B:
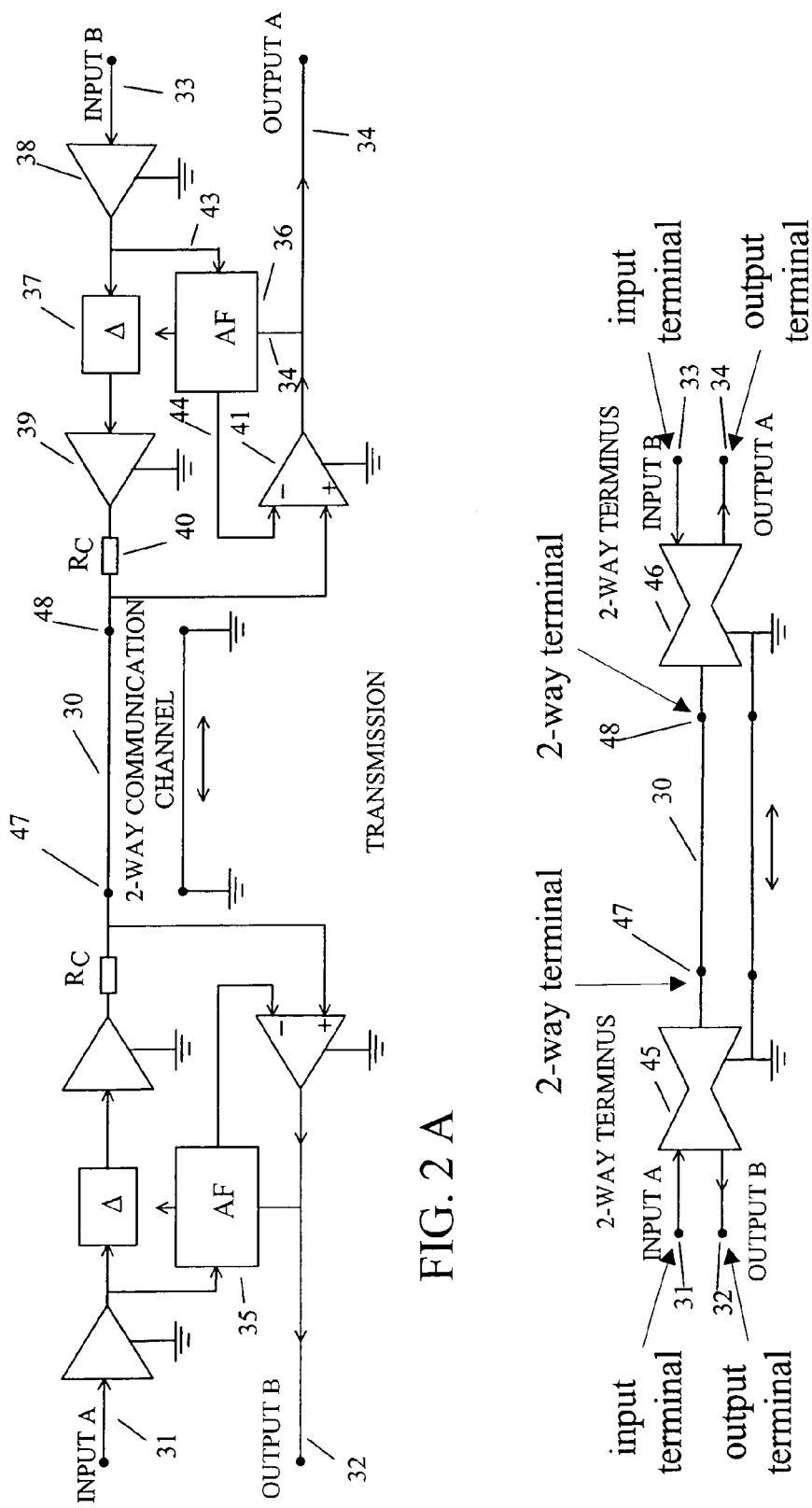
FIGS. 2A–2B show a system that can transmit data signals in two directions at the same time in the same frequency band, and a functional representation of it.

Further referring to FIG. 2A, the adaptive filter 36 would need only a single weight if this filter were completely implemented in analog form, if the delay unit 37 had no delay, if the amplifier 39 had a perfectly flat frequency response with no phase shift, if the resistor $R_c$, 40 were purely resistive and if the characteristic impedance of the transmission line 30 were purely resistive, if the difference amplifier 41 had a perfectly flat frequency response with no phase shift, and the analog adaptive weighting coefficient of filter 36 had a flat frequency response with no phase shift. Since these idealizations are not perfectly realized in practice, better performance is obtained when the delay 37 provides a small signal delay, and the adaptive filter 36 had more than a single weight. If this adaptive filter were implemented as diagrammed in FIG. 1A as a digital realization with an analog interface to the rest of the circuit, the analog-to-digital converters 26 and 28, and the digital-to-analog converter and low-pass filter 27 would need to have clock rates at the Nyquist rate for the bandwidth of input signal 43, or preferably several times that. Because of the above mentioned circuit imperfections and imperfections in the ADC's 26 and 28, and in the DAC circuit 27, more than one weight will generally be required by adaptive filter 36 so that it can adjust its frequency response to balance out and cancel the transmitted signal components from the signal to be received.

There are many other forms of adaptive filter that could be used in place of the adaptive filter shown in FIG. 1A. One of the most widely used is the adaptive lattice filter adapted by the recursive least squares (RLS) algorithm. Various lattice forms are taught in the Widrow and Steams book and in the Haykin Book. Other adaptive filtering structures are also taught in these books, such as adaptive filters with both adaptive feedforward and feedback filters. Such filters can be used with the present invention.

Referring now to FIG. 2A, a circuit is shown that can transmit signals or data in two directions at the same time via the same communication channel, using the same frequency band for transmission in both directions. The circuit contains an electric transmission line, six operational amplifiers, two delay units, two adaptive filters, and two line termination impedances. The transmission line 30 could be twisted pair, coaxial cable, or waveguide. At the left end of the channel, input A, 31 is applied. After a transmission delay, this signal appears amplified as output A, 34 at the right end of the channel. Input B, 33 is applied at the right end of the channel, and it appears amplified as output B, 32 at the left end of the channel. Once the adaptive filters 35 and 36 adapt and converge, and remain converged by allowing their respective adaptive algorithms to be continually executed, inputs A and B can be simultaneously transmitted and received without distortion and without interfering with each other.

Referring once again to FIG. 2A, the input B, signal 33, is applied to operational amplifier 38, whose output drives a small-delay unit $\Delta$, 37, whose output drives another operational amplifier 39 whose output drives the transmission line 30 through an impedance 40 whose value equals the characteristic impedance $R_c$ of the transmission line. It is clear that input B is driving the transmission line. Input B will be transmitted through the transmission line and will be available for reception at the left end. The amplifier 38 and 39 can have gains that are greater than or less than unity, so a signal of any desired amplitude can be transmitted. Depending on signal levels and impedance levels, some of the amplifiers may be able to be omitted and replaced with direct wires.

As shown in FIG. 2A, the operational amplifiers have essentially infinite input impedances and zero output impedances, and so the transmission line is properly terminated on its right end. The same is true for the left end, since the associated circuit is the same on the left as on the right. There will be no reflections at the ends of the channel.

Operational amplifier 41 is connected to the right end of the transmission line in order to obtain output A, 34. This connection to the transmission line also allows amplifier 41 to receive input B, which is troublesome. To solve the problem, adaptive filter 36 is enlisted to cancel the input B components so that they do not appear at the right end output mixed with the output A signal. The adaptive filter is connected so that its input 43 receives the input B signal early in time, before going through the small time delay $\Delta$, 37. The transmission line receives the input B signal after it goes through delay Δ. This gives the adaptive filter a slight head start in doing its processing. If the head start is not necessary, the delay Δ, 37, could be omitted. The output 44 of the adaptive filter is subtracted from the transmission line signal by operational amplifier 41 in order to cancel the input B signal from the transmission line signal. The output 34 of amplifier 41 is used as the error signal for adaptation of the filter 36. Minimizing the mean square error by means of the adaptive algorithm minimizes the power of output signal 34. Output signal 34 contains output A plus the uncancelled residue of input B. Since input B and input A will be separate trains of information and will therefore be uncorrelated with each other, the power of signal 34 will be the sum of the respective powers. Adapting the weights of the adaptive filter to minimize the total power of output signal 34 will therefore minimize the residue of input B contained in output A. So, input B is transmitted without interfering with the reception of output A. In like manner, at the other end of the channel, input A is transmitted without interfering with the reception of output B.

FIG. 2B shows a functional diagram of the data transmission system of FIG. 2A. The circuit at the right end of the communication channel 30 in FIG. 2A is symbolically represented by the irregular hexagon 46 in FIG. 2B. This is a "2-way terminus". Input B, 33, is transmitted, and output A, 34 is received. The terminus is equipped to drive transmission line 30 and to receive signals from it. At the left end of the transmission line is another 2-way terminus 45, whose input is 31 and whose output is 32. The transmission system of FIG. 2 has been tested and works well. The terminus units terminate the transmission line with its characteristic impedance, so no reflections will take place at the ends of the transmission line. The 2-way terminus units serve as amplifiers and line drivers and provide ports for input and output signals. The 2-way terminus device 45 has an input terminal 31, an output terminal 32, and a 2-way terminal 47.

If attenuation from wave travel in the transmission line is excessive, as will be the case with long distance transmission, amplification along the line will be necessary. With 2-way signal transmission, this presents a problem since repeater amplifiers are normally unilateral. What is needed is a 2-way repeater amplifier.

Figure 3A:
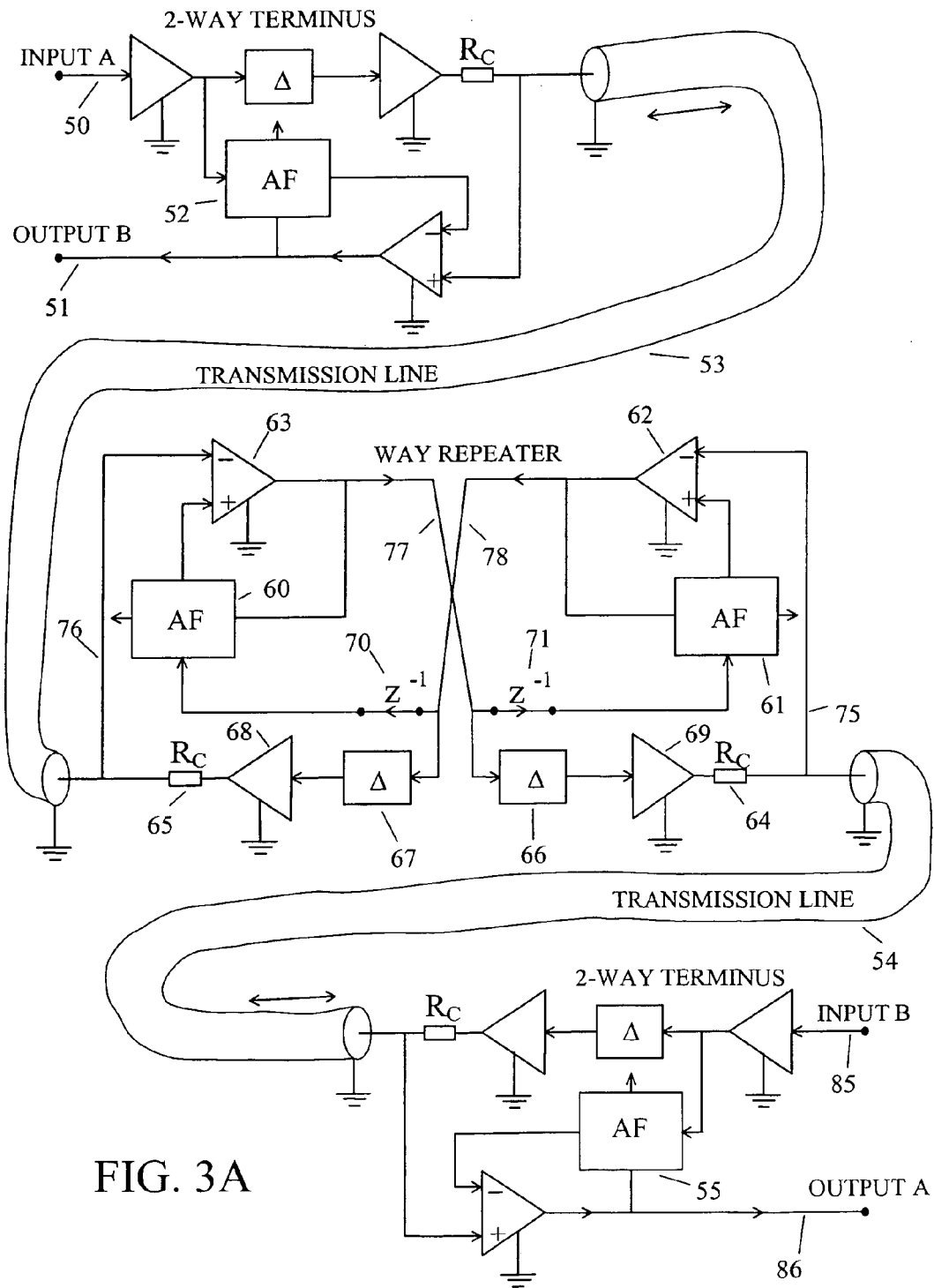
FIGS. 3A–3E show a system for two-way transmission of data signals which includes a 2-way repeater amplifier, experimental data showing learning, convergence, and low steady-state error for simultaneous two-way signal transmission, a functional representation of this system and a functional representation of a system whose 2-way repeater includes circuits that de-modulate, and recreate the digital baseband signals, then re-modulate and amplify them for further transmission.
Figure 3:
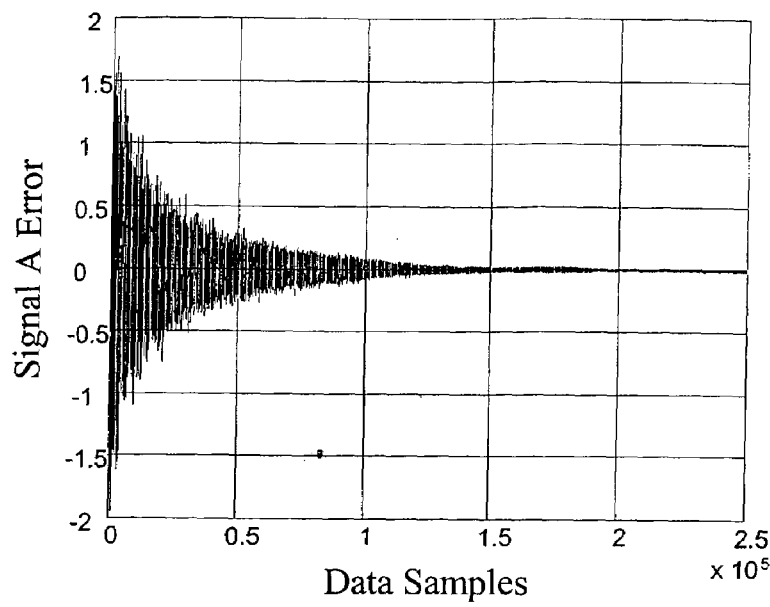
Figure 3:
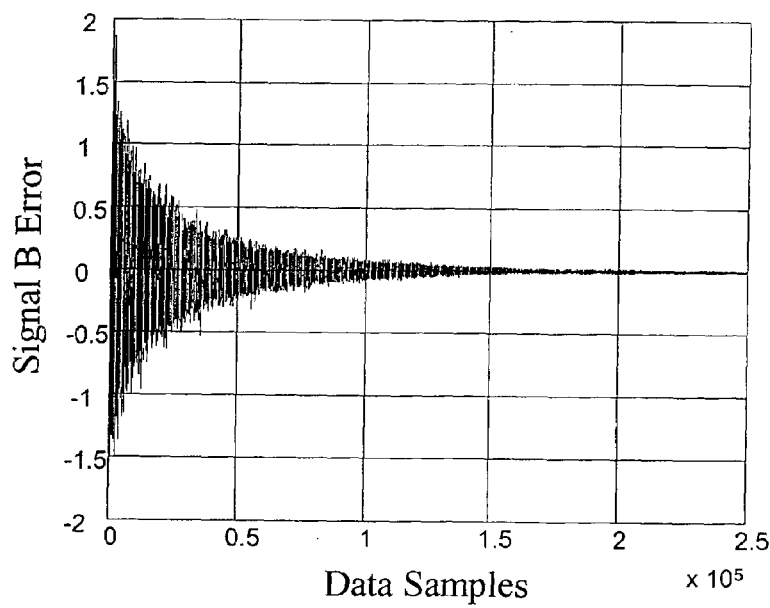
Figure 3:
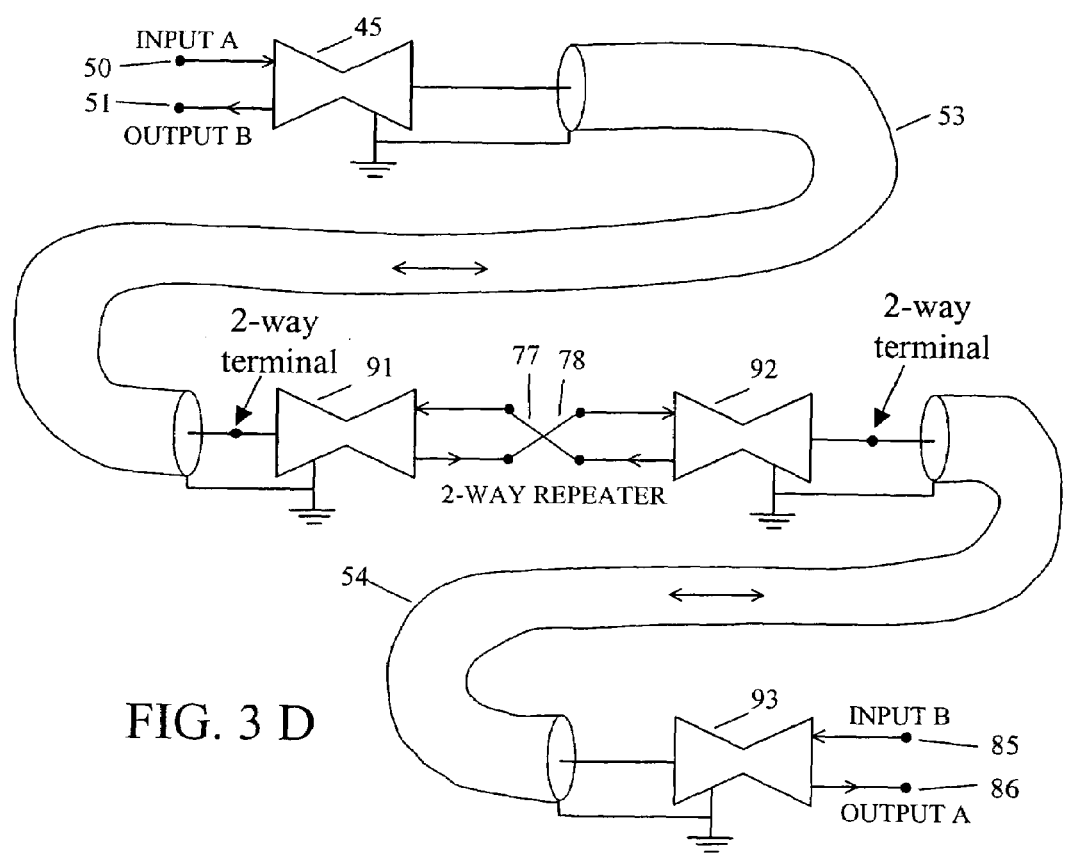
Figure 3:
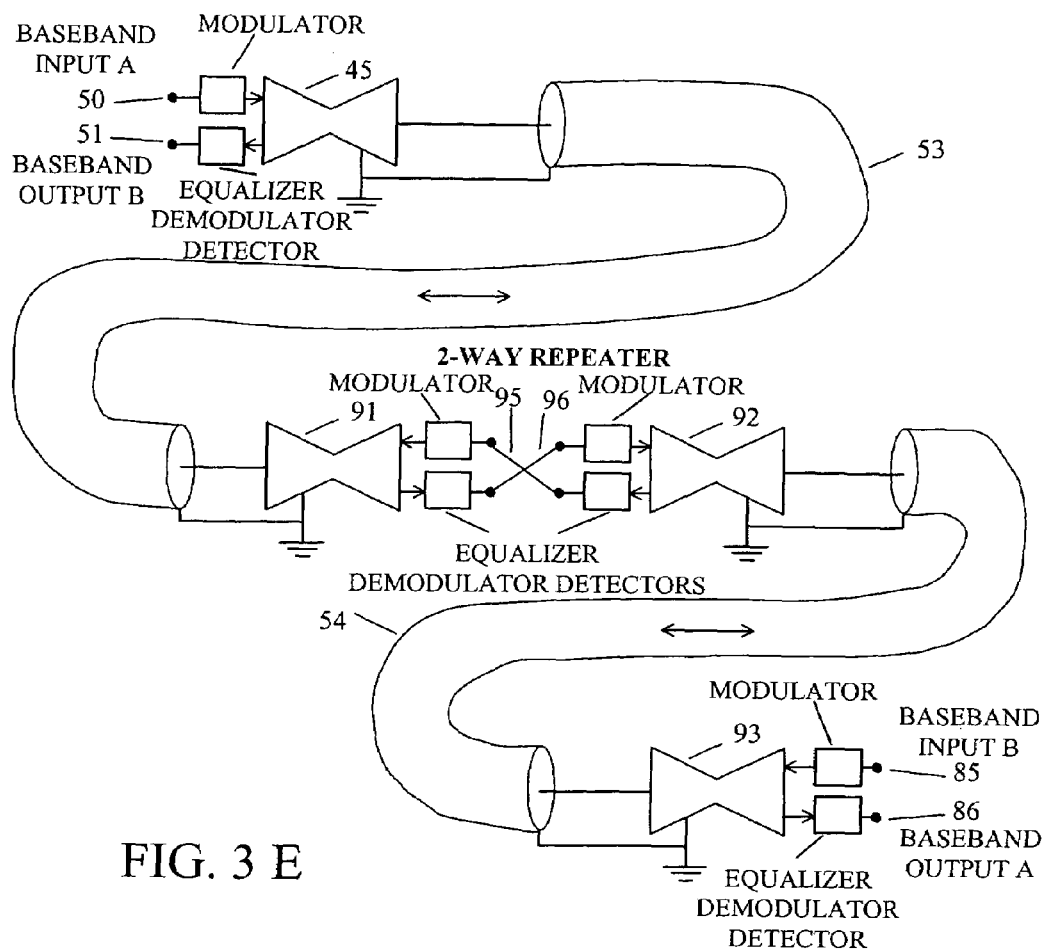

A design for such an amplifier is shown in connection with the data transmission system of FIG. 3A. A 2-way terminus is connected to transmission line 53, which in turn is connected to a 2-way repeater amplifier, which in turn is connected to transmission line 54, which is connected to a 2-way terminus. Input A, 50, is applied at the top of the diagram. It emerges as output A, 86, at the bottom of the diagram. Likewise, input B, 85, is applied at the bottom of the diagram and it emerges as output B, 51, at the top of the diagram. In the middle of the diagram is the 2-way repeater amplifier. On close examination, one can see that the 2-way repeater consists of two 2-way terminus units connected "back-to-back" by crisscross wires 77 and 78.

Following input A through the system, it is amplified by its 2-way terminus and then it drives transmission line 53. This signal propagates through the line and arrives at the 2-way repeater. It is amplified by operational amplifier 63 and outputted on line 77. This line provides an input to a small-delay unit Δ, 66 whose output drives operational amplifier 69. The output of this amplifier drives transmission line 54 through impedance 64 whose value is $R_c$, the characteristic impedance of the line. The signal travels through line 54 to the second 2-way terminus where it is further amplified and outputted as output A, 86. In like manner, input B travels through the system in the reverse direction.

The adaptive filters 52 and 55 when converged, prevent outbound signals from interfering with inbound signals in both of the 2-way terminus units. The same function is served in the 2-way repeater circuit by adaptive filters 60 and 61, when they are converged. It should be noted that both ends of transmission lines 53 and 54 are properly terminated to prevent reflections.

The inputs of adaptive filters 60 and 61 are delayed by unit delays 70 and 71. These delays are incorporated in the system so that the closed-loop path starting with delay 70, through adaptive filter 60, through amplifier 63, through crisscross wire 77, through delay 71, through adaptive filter 61, through amplifier 62, through crisscross wire 78, and back to delay 70 has at least one unit of delay along this closed path. This is required for all digital closed-loop systems. Accordingly, Δ delays 67 and 66 must each have at least one unit of delay, and with more delay than that, the adaptive filters will have head starts if this is needed. The adaptive filters could be all analog or they could be implemented as in FIG. 1A. They will generally need more than one weight. They could also be adaptive lattice filters or they could be adaptive feedforward and feedback filters.

The system of FIG. 3A has been tested by turning on input A and input B and starting the adaptive processes. Convergence was fast and sure, and transmission in both directions without interference was observed. Test results are shown in FIGS. 3B and 3C. The error in transmission of signal A is obtained by subtracting input A, 50 from output A, 86. The difference, "signal A error", is plotted in FIG. 3B as a function of time. Time is accounted for in terms of number of data samples that have traveled through the system. At the beginning of time, the error is large, but it becomes small exponentially as the adaptive filters learn. After convergence, the residual is very small. FIG. 3C shows the "signal B error" versus time. The residual error here is also very small after the adaptive filters converge.

FIG. 3D is a functional diagram of the system of FIG. 3A. The transmission lines 53 and 54 could be coaxial cable, twisted pair, parallel wires, or waveguide. For long transmission lines, more 2-way repeaters can be inserted to overcome transmission loss.

The 2-way repeater amplifier has two terminals. They may be called 2-way terminals. These terminals connect to the two transmission lines 53 and 54 in FIG. 3D. They carry signals both ways. When digital data is transmitted over long transmission lines with many repeater amplifiers, noise can accumulate and cause bit errors. To avoid such errors, it is common in one-way transmission systems to design repeaters that receive the transmitted signal, equalize the line, demodulate and detect the transmitted signal to recover the baseband bit stream, and then re-modulate and amplify the signal for further transmission. Equalization, demodulation, and detection are standard well-known operations and are generally all done in one circuit or subsystem. A basic reference on the subject is the book by R. Gitlin, et. al., "Data Communications Principles", Plenum Press, New York, 1992.

The same idea can be applied to two-way transmission systems. A functional representation of such a system is shown in FIG. 3E. The equalizer, demodulator, and detector function block, and the re-modulator function block are located in the correct places in the system so that these operations do not interfere with adaptive functions that take place in the 2-way terminus devices 45, 91, 92, and 93. In the 2-way repeater, crisscross wire 95 carries the baseband input B signal, and crisscross wire 96 carries the baseband input A signal.

Figure 4:
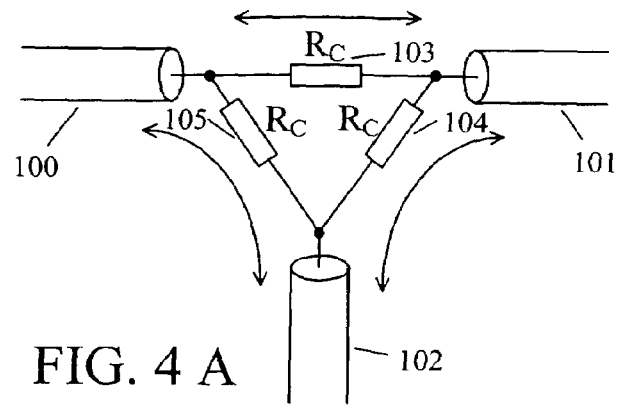
FIGS. 4A–4C show several methods for making "T"-connections that allow two-way communication between three transmission lines.
Figure 4:
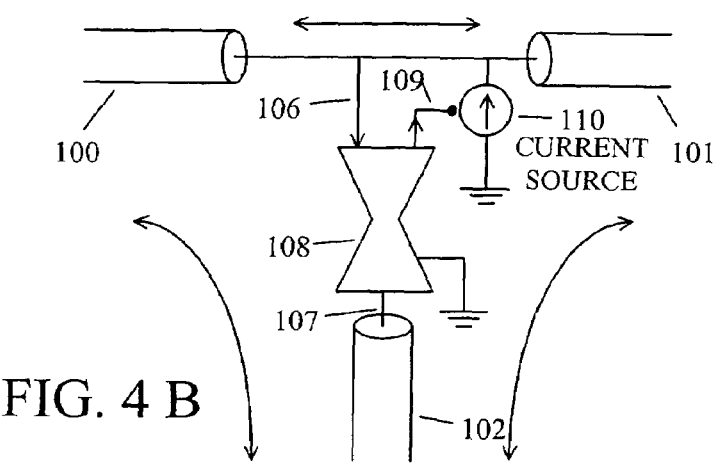
Figure 4:
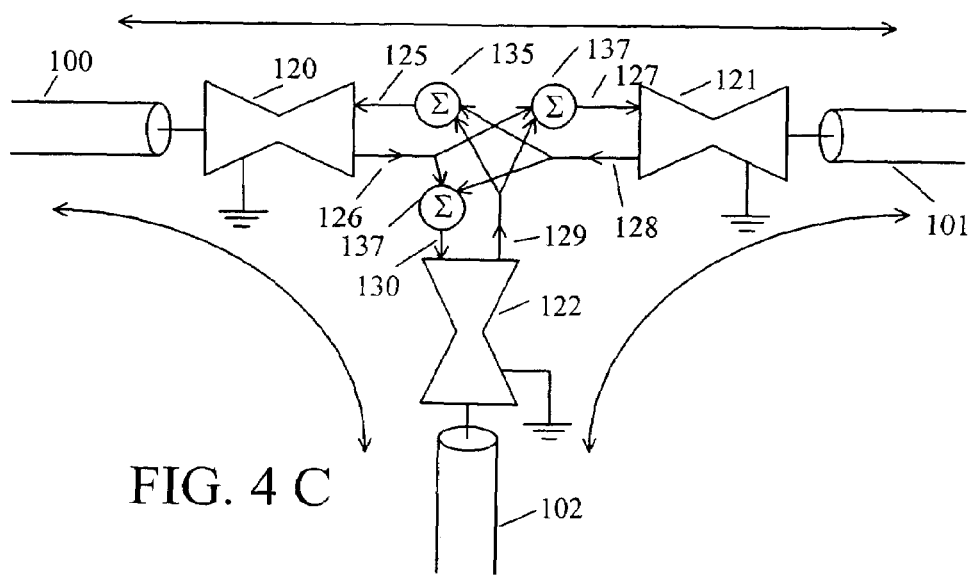

There is often a need to connect three transmission lines together. What is needed is a "T-connection" for 2-way transmission. There are many ways to do this, three of which are shown in FIG. 4. The purpose here is to provide a means of connection that would allow two-way communication among the three transmission lines.

The simplest connection is shown in FIG. 4A. This connection allows communication in the direction indicated by the arrows. The three impedances 103, 104, 105 have values equal to $R_c$, the characteristic impedance of lines 100, 101, and 102. Accordingly, all three lines are properly terminated to prevent reflections. The coupling is passive, and signal losses of 6 dB will be experienced when transmitting from one transmission line to another.

In order not to loose signal level and indeed increase signal level when coupling line 102 to either 100 or 101, an active coupling of the type shown in FIG. 4B could be used. The coupling means includes a 2-way terminus 108 and a controlled current source 110. Connecting these to the direct wire between lines 100 and 101 with the two-way terminus connected to line 102 as shown leaves all three lines properly terminated in the characteristic impedance $R_c$, thus there will be no reflections. Lines 100 and 101 will be able to directly communicate two-ways. Line 102 will be driven by the 2-way terminus 108 with a signal originating either from line 100 or line 102. A signal arriving from line 102 appearing at the output 109 of the 2-way terminus will control the current source 110 and cause a signal to propagate in both lines 100 and 101, Thus all three lines will be able to communicate two-way with each other. Each line will be able to transmit to the other two and will be able to receive whatever is transmitted by the other two. The arrows indicate the allowed directions of signal transmission.

Another way to make this connection is shown in FIG. 4C. This is a symmetrical active coupling permitting amplification in each direction. Three 2-way terminus units, 120, 121, and 122 are utilized. The output signals of each pair of terminus units are added by summers 135, 136 and 137. The sums drive the inputs of the terminus units which are connected to transmission lines 100, 101 and 102. This connection allows 2-way communication among the three transmission lines, as before. The circuit of FIG. 4C is a 2-way repeater amplifier in the form of a T-junction, enabling the interconnection of three transmission lines. The same idea can be used to interconnect four or more transmission lines.

Figure 5:
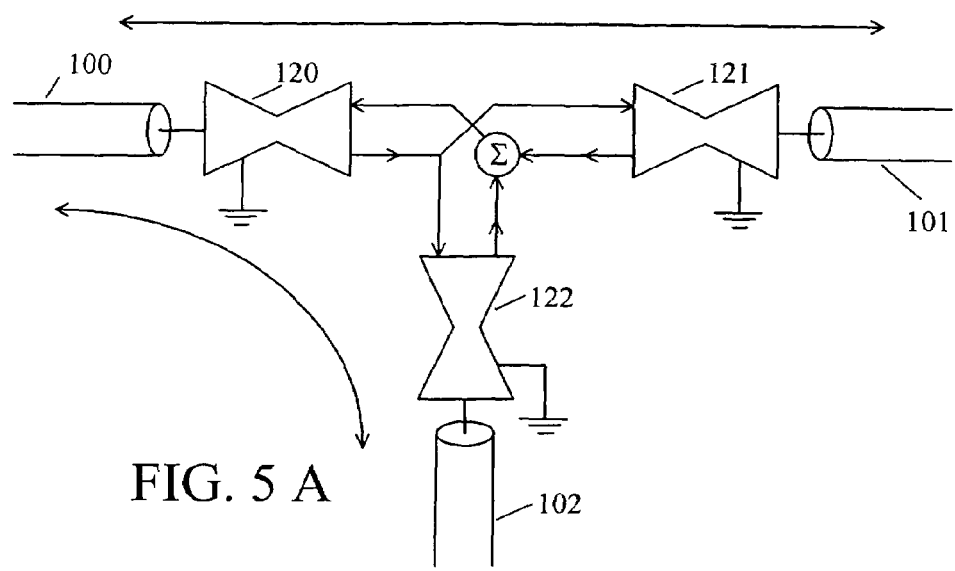
FIGS. 5A–5E show methods for making connections between three or more transmission lines that provide communication paths other than simple two-way links between all the transmission lines.
Figure 5:
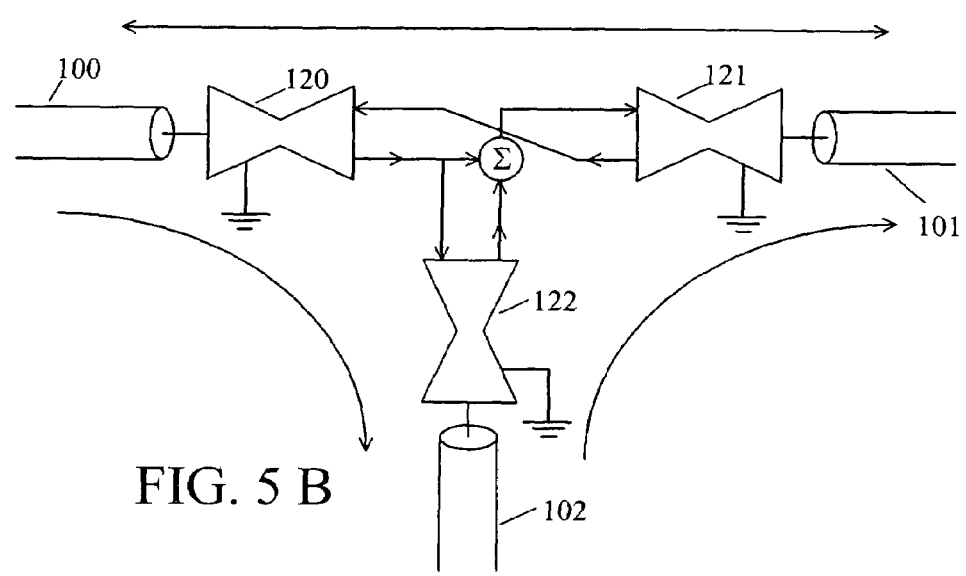
Figure 5:
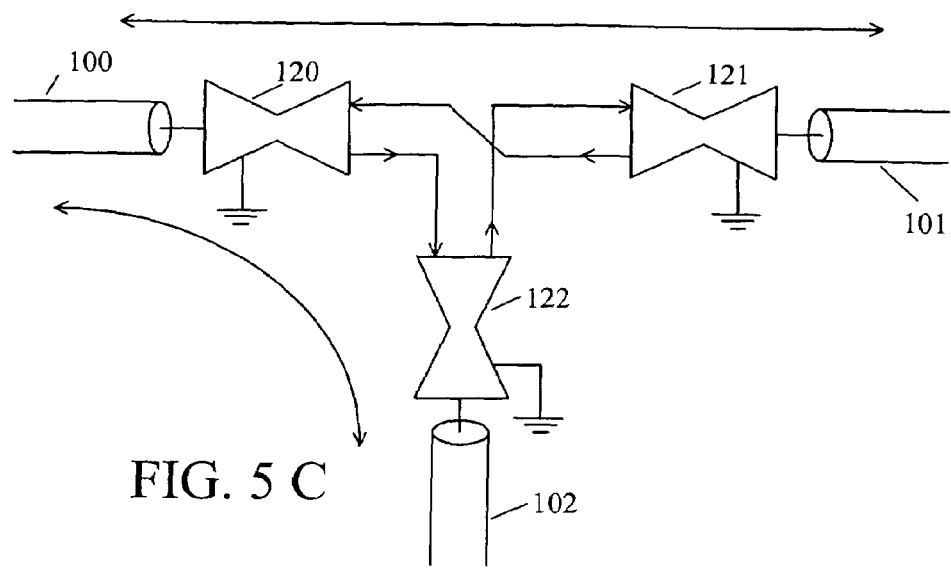
Figure 5:
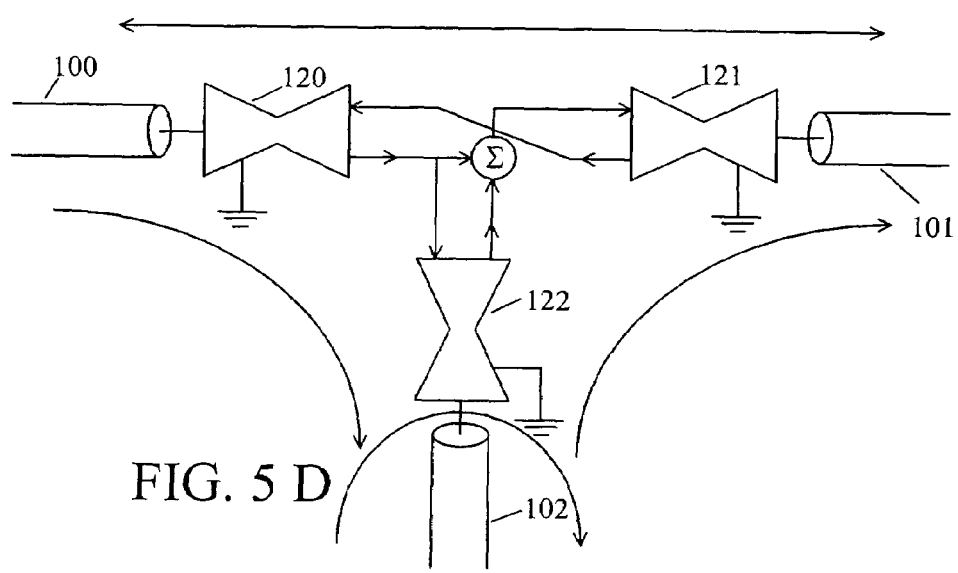
Figure 5:
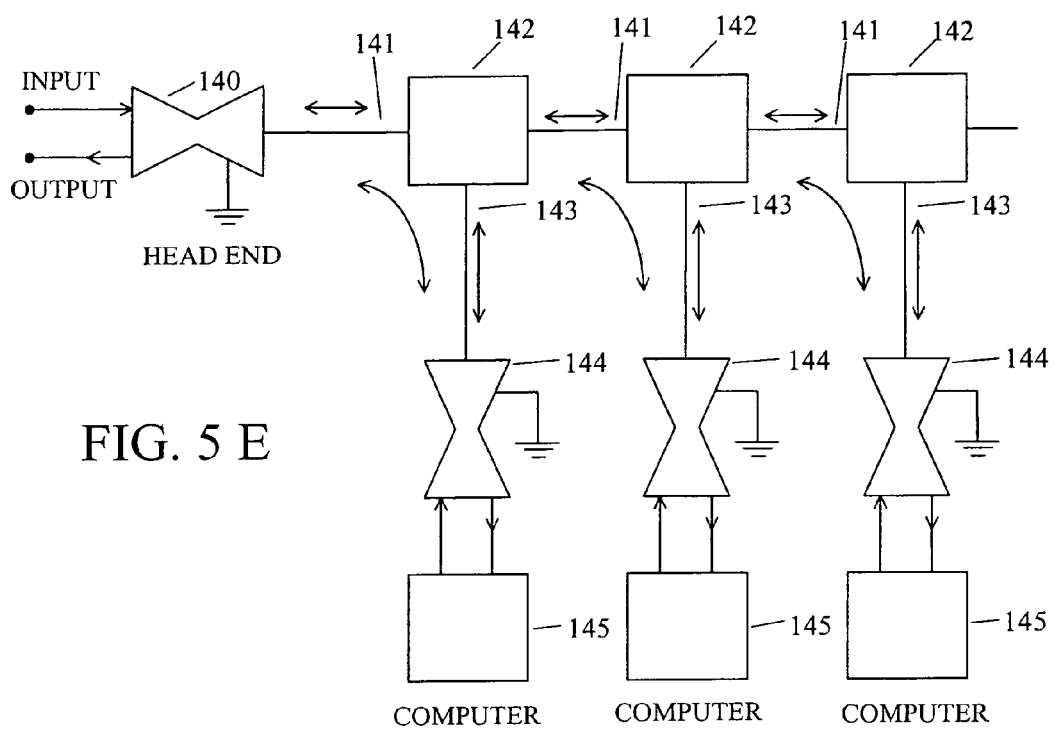

FIG. 5 shows examples of other ways of connecting three cables together in order to realize unusual communication paths. FIG. 5A shows a connection that allows two-way communication between cables 100 and 101, and two-way communication between cables 100 and 102, but no communication in either direction between cables 102 and 101. FIG. 5B shows a connection that allows two-way communication between cables 100 and 101, but only allows one-way communication from cable 102 to cable 101, and one-way communication from cable 100 to 102. FIG. 5C shows a circuit that affords a set of only one-way communication links from cable 100 to cable 102, from cable 102 to cable 101, and from cable 101 to cable 100. FIG. 5D shows a circuit that allows two-way communication between cables 100 and 101, one-way communication from cable 100 to cable 102, one-way communication from cable 102 to cable 101, and a return echo path from cable 102 back to cable 102. These are examples that give some idea of what can be done with interconnection of three cables, each carrying signals and data in two directions. These connections can be switched, mechanically or electronically, to change the communication paths as desired. The same methods can be used for joining four cables, or more.

FIG. 5E shows an application of these methods to a simple communication network. At the head end of the network, there is a 2-way terminus 140 that allows two-way connection to the main line. Each of the T-connections 142 is configured like the circuit of FIG. 5A, and connected to a set of 2-way terminus units 144 via cables 143. The terminus units allow one to connect information devices 145, such as computers, to the network. The head end is able to have two-way communication with all the information devices, according to this configuration, yet the information devices cannot communicate with each other. Information security requirements might require information paths like those of FIG. 5A. Other networks can of course be realized by using the principles taught by the diagrams of FIG. 5.

FIG. 6A shows a two-way radio system capable of transmitting and receiving simultaneously with the same antenna in the same frequency band. The received signal comes from a distant transmitter and carries information that is independent of the baseband signal to be transmitted 150. The received signal drives the coil 161, which acts as the primary of an RF transformer. This coil couples with coil 162 to provide an RF input to the radio receiver 168. Subtracted from this RF input by summer 172 is a signal 170, which is made equal to an RF interference signal that comes from the transmitter. The transmitter couples from coil 160 to coil 161 and feeds the antenna. At the same time, coil 160 couples with coil 161, and in this way introduces strong interference into the radio receiver input. An adaptive filter 166 produces the canceling signal 170 to remove the interference from the radio receiver input. This is critical because the weak signal to be received is in the same frequency band as is the strong interference from the transmitter.

The baseband information signal 150 to be transmitted is fed to a modulator 151 whose output is the RF signal to be transmitted. The output 165 of the modulator is fed to a delay unit 152 whose output goes to the final RF power amplifier 154 that drives the antenna 171 through coils 160 and 161. The modulator output 165 is further provided as an input signal to the adaptive filter 166. The delay 152 provides a small time delay that compensates for the delay through the coupling transformer, coils 160, 161 and 162, and gives the adaptive filter a small head start in processing time. The adaptive filter filters the RF output of the modulator and provides the canceling signal 170. The error signal 167 of the adaptive filter is actually the input signal to the radio receiver. The adaptive filter minimizes the mean square of signal 167. The power of signal 167 is the sum of the powers of two uncorrelated components, the received RF signal and the uncancelled residue of the transmitted signal. Minimizing mean square error minimizes the power of the residue of the transmitter interference.

The length of the impulse response of the adaptive filter 166 is proportional to the number of its weights. The length of this impulse response minus the delay time of 152 determines the time extent over which the adaptive canceller will cancel received echoes reflecting from structures near the antenna. The adaptive filter cancels the transmitted signal and its near reflections that arrive within a time window determined by the length of the impulse response of filter 166. The system designer can choose the length of this impulse response. The longer the impulse response however, the more adaptive weights will be used and the slower will be the convergence of the adaptive filter. Convergence time is proportional to the number of weights.

When the transmitter power is very high and when the received signal is very faint, the use of a directional coupler or "hybrid device" 180 of FIG. 6B improves performance. Substituting the directional coupler for the transformer coils 160, 161, 161 of FIG. 6A, the transmitter interference at the receiver input could be reduced by 30–40 dB before the adaptive filter begins to cancel residue. Transfer of power from the transmitter output stage 154 to the antenna would not be significantly impaired. Transfer of received power from antenna to the radio receiver would also not be significantly impaired. The rest of the circuit of FIG. 6B works exactly like the rest of the circuit of FIG. 6A. The directional coupler of FIG. 6B has three ports or sets of terminals. A 2-way terminal connects to the antenna 171. An input terminal connects to the RF amplifier 154. An output terminal connects to the summer 185 via line 187. Directions of signal flow are indicated by the arrows.

Many other ways exist for coupling transmitters and receivers to the same antenna. The ideas taught here apply to them also and are not restricted only to the two coupling means that are illustrated in FIGS. 6A and 6B.

Using two transmitter/receiver units of the type shown in FIG. 6, full duplex operation in the same frequency band is possible. Since separate frequency bands would not be needed for transmitting and receiving, two-way communication requires only half the bandwidth. An application for this is in cellular telephony. Telephone traffic within a given cell could be doubled. This could be very significant for all forms of two-way wireless Internet traffic.

The circuits of FIG. 6 could also be used in Doppler radar systems of the pulsed type or the continuous wave (CW) type. All the circuit components of FIG. 6 can be realized with microwave devices. The Doppler return echo is of a slightly different frequency from that of the transmitted RF energy and is uncorrelated with it.

In the CW case, the adaptive filter or the combination of directional coupler and adaptive filter would remove the interference from the transmitter before it enters the receiver. In the pulsed radar case, the transmitted pulse would be removed from the receiver input so that close-in echoes could be detected even though their arrival takes place before the transmitted pulse stops.

The circuits of FIG. 6 use a single antenna for transmitting and receiving at each end of the wireless channel. Transmitting and receiving are done simultaneously in the same frequency band so that the utilization of the band is doubled. This utilization factor can be increased considerably for many users operating in a local geographic area who are communicating simultaneously in the same band by replacing each single antenna with an antenna array connected to comprise an adaptive beamformer.

Adaptive beamformers or adaptive antennas of the type preferred herein were first described in the paper "Adaptive Antenna Systems," by B. Widrow, P. E. Mantey, L. J. Griffiths, and B. B. Goode, published in the Proceedings of the IEEE, Vol. 55, No. 12, December 1967, pp. 2143–2159. This and other forms of adaptive antennas are described in the Widrow and Stearns book, Chapters 13 and 14. Many other books and papers have since been published on these subjects.

Figure 14:
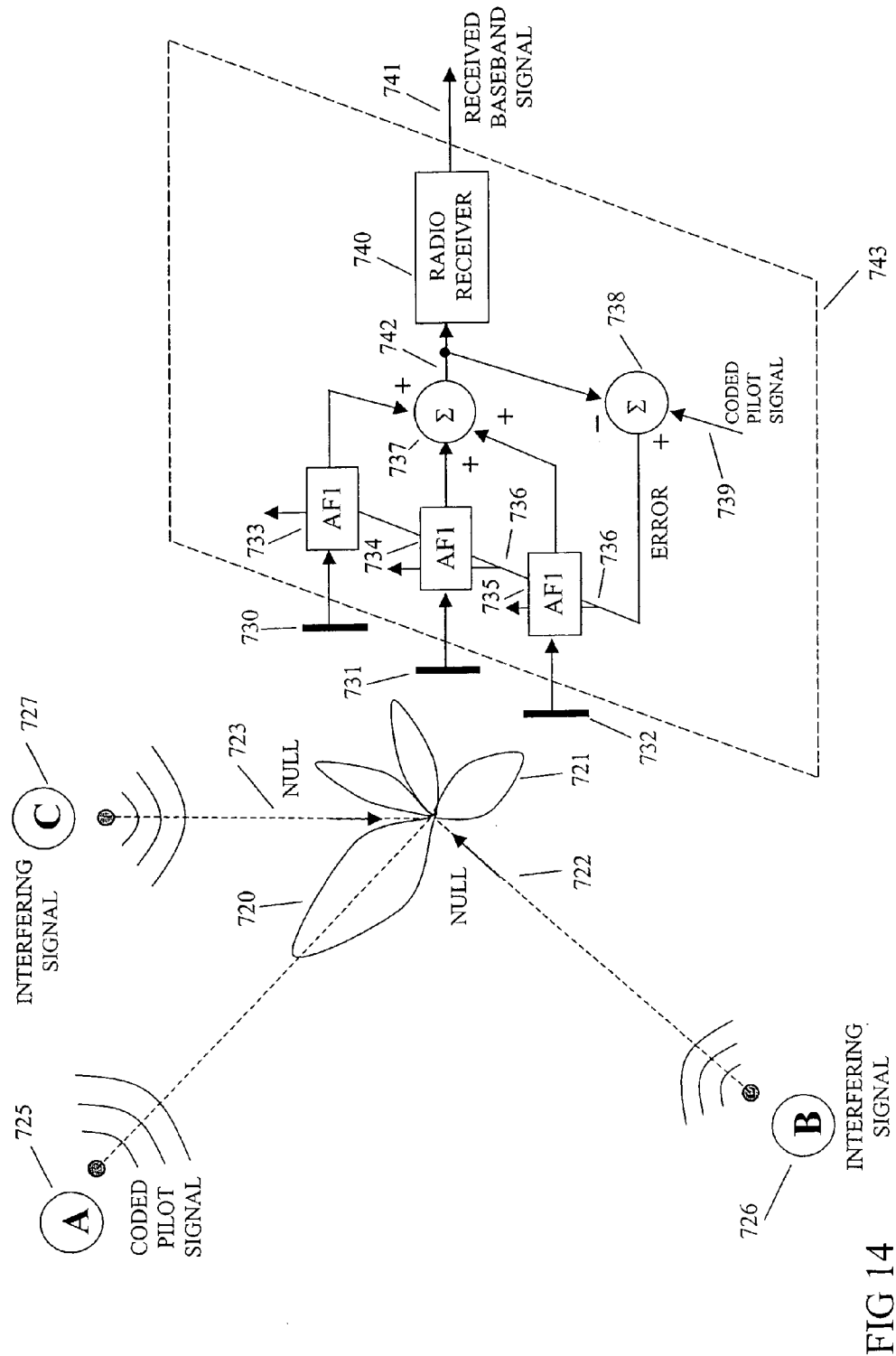
FIG. 14 shows a receiving adaptive beamformer whose main beam points in the direction of a coded training signal or pilot signal, this beamformer capable of forming nulls in the directions of unwanted interference (prior art).

Referring to FIG. 14, an adaptive beamformer of the preferred type is diagrammed. The objective of this system is that the adaptive beamformer 743 receive a signal from source A, 725, in spite of strong interference in the same band from sources B, 726, and C, 727. The adaptive beamformer receives signal from an array of antenna elements 730, 731, and 732. More antenna elements can be used as required. The antenna elements, which could be dipole antennas, are connected to supply signals to adaptive filters 733, 734, and 735. The outputs of the adaptive filters are summed by summer 737 to form the input signal for radio receiver 740. The baseband output of the adaptive beamformer is the radio output 741. If signal C, 725, is coded with a known random code, and the same coded signal 739 is used as the desired summed response of the adaptive filters, the filters will automatically train themselves to cause the adaptive array to receive the coded signal 725 from source A. An antenna array receives a signal by pointing a main beam at it. In this case, the main beam 720 is formed by the adaptive process. The interfering signals B, 726, and C, 724, being independent of and therefore uncorrelated with the coded signal 739, will be rejected by the beamformer. An antenna array rejects a signal by placing a null in its direction. Thus nulls 722 and 723 form automatically, as a result of the adaptive process, in the directions of the interferences 726 and 727. In addition to the main beam 720 and the nulls 722 and 723, the antenna pattern includes "sidelobes" 721. The shape of the antenna pattern develops from the adaptive process to reproduce the coded signal (which is the desired response 739) as best possible in the least squares sense. This implies reproduction of the coded signal 725 and elimination of the interferences 726 and 727. The main beam points at source A, the signal of interest, and nulls are pointed at sources B and C, the interferers.

This works even in the presence of severe multipath. The goal is seeking the coded signal and rejecting all else by the action of adaptive filtering. The desired signal will be received and the undesired signals will be rejected even though the main beam would not look "beam-like" and the nulls would not look "null-like", and this would be perfectly fine as long as the goal is achieved. For sake of discussion, the adaptive antenna methods and algorithms will be described below in terms of idealized main beams and nulls.

The coded signal of source A is often called a "pilot" signal. It is used to train the adaptive beamformer to reproduce signal A and to reject all else as well as possible. The pilot signal could be turned on at predetermined times, known to the adaptive beamformer, which turns on the coded pilot signal 739 at the same times for training. No information is transferred during the training episodes. At other times, no training takes place and the weights of the adaptive filters remain fixed while data is conveyed by the wireless link. There are methods for training while data is transferred, and the pilot signal is not turned on, methods such as decision directed learning and constant modulus algorithms. These are well known in the adaptive filtering literature. A good reference is the book by Simon Haykin, "Adaptive Filter Theory," third edition, Prentice Hall, 1996.

Figure 15:
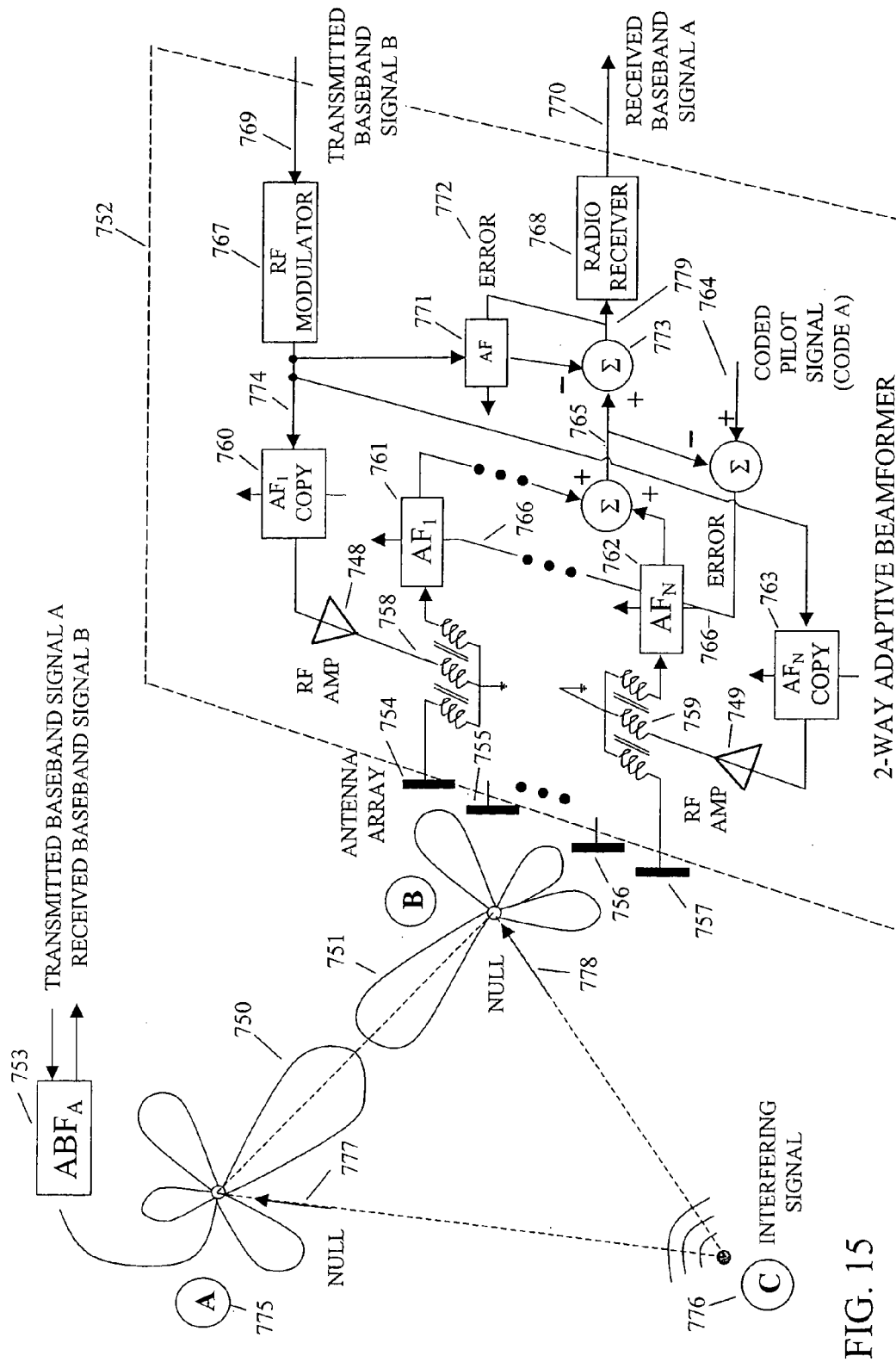
FIG. 15 shows a 2-way adaptive beamformer, able to learn to place nulls in the directions of unwanted signals while receiving, and having the same directivity pattern while transmitting.

The adaptive beamformer of FIG. 14 is intended for receiving only. Referring to FIG. 15, a 2-way adaptive beamformer 752 is shown. It makes use of the principle of reciprocity to transmit and receive with the same antenna directivity pattern. Thus, nulls that are learned from receiving also appear in the transmitting pattern and cause essentially no interference to be transmitted by the 2-way adaptive beamformer toward its sources of interference. The same antenna pattern exists for both transmitting and receiving because both transmitting and receiving are using the same frequency band with the same array of antenna elements with the same filtering.

The receiving portion of the system of FIG. 15 is very similar to that of FIG. 14. The transmitting portion of the system is introduced here together with the adaptive filter 771 whose purpose is to subtract the transmitted signal from the radio receiver input 779. Two adaptive beamformers, A and B, can communicate with fall duplex in spite of the presence of the interfering signal C, 776, once the two adaptive beamformers have been trained to receive each other. After having learned to receive each other, they will then be able to transmit to each other without further adaptation. It is not even necessary for either one of them to have knowledge of the location and direction of the other party, or of the sources of interference. Antenna A would only need to know the code of the pilot signal transmitted by B, and B would only need to know the code of the pilot signal transmitted by A. The different pilot signals should be designed to be mutually uncorrelated. They will find each other, and eliminate interference, even in the presence of multipath.

Referring now to FIG. 15, the antenna elements of beamformer B, 754, 755, 756, 757, and others, are coupled to adaptive filters 761, 762, and others. Coupling is through transformers such as 758 and 759, but many other coupling networks could be used. It is important, however, that all coupling networks be identical in order to have the same antenna directivity pattern for transmitting and receiving, in accord with the principle of reciprocity. The outputs of adaptive filters 761, 762, etc. are summed, and the resulting signal 765 provides an input to the radio receiver 768. Its output is the received baseband signal 770. This is the receiving path, from the antenna elements to the radio receiver output. The transmitting path begins with the transmitted baseband signal 769, which is applied to the RF modulator 767, whose output 774 is the input to a set of controlled filters, including 760 and 763. Corresponding to each adaptive filter such as 761 and 762 in the receiving path, there are controlled filters in the transmitting path (such as 760 and 763). The outputs of the controlled filters couple to the corresponding coupling networks (such as 758 and 759) to the corresponding antenna elements (such as 754 and 757). The controlled filters are identical to the adaptive filters in having the same architecture and the same adjustable parameters. The parameters of the controlled filters are set at every moment to correspond exactly (digital copies) to the corresponding parameters of the corresponding adaptive filters. The receiving system learns to form the receiving directivity pattern, and thereby controls and makes identical the directivity pattern of the transmitting system. The relative phases and relative amplitudes, at all frequencies in the band, of the currents driving the antenna elements when transmitting will be identical to the relative phases and relative amplitudes, at all frequencies in the band, of the received voltages from the antenna elements when receiving. In accord with reciprocity theory, this causes the directivity pattern to be the same for transmitting and receiving, at each frequency in the band.

Figure 16:
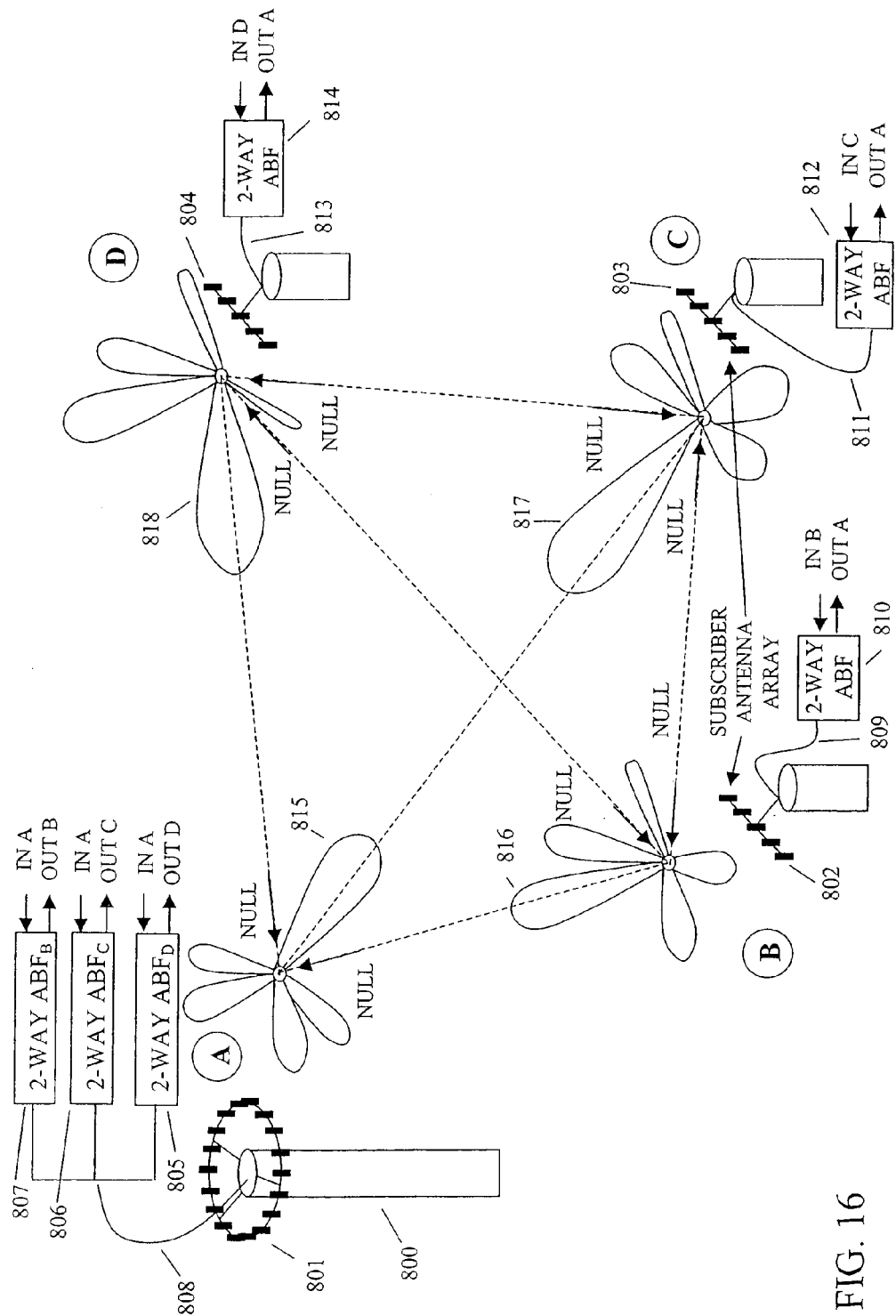
FIG. 16 shows a central adaptive central adaptive beamformer capable of simultaneous two-way communication on the same frequency band with individual subscribers.

Referring now to FIG. 16, a wireless communication system that provides 2-way communication between a central array 801, and a set of subscriber arrays 802, 803, and 804, is shown. The central array is mounted on a local tower 800. The subscriber arrays only communicate with the central array and do not communicate with each other directly. Thus there are three 2-way communication paths shown in FIG. 16, and if each path had its own frequency band, six frequency bands would be required. However, if each subscriber array were equipped with 2-way adaptive beamformers, and if the central array were equipped with three separate 2-way adaptive beamformers, only a single frequency band would be required to achieve the same objective.

Antenna directivity patterns are drawn for each of the subscriber arrays 802, 803, and 804, in FIG. 16. The main lobes all point toward the central array 801. For array 802, nulls appear in the directions of arrays 803 and 804. Its main lobe points at the central array 801 because, during training, the pilot signal for adaptive beamformer (ABF) 810 is identical to the pilot signal transmitted by adaptive beamformer 807 connected to array 801. The nulls form the directions of arrays 803 and 804 because these arrays transmit coded signals during the training period that are uncorrelated with the pilot signal of adaptive beamformer 810. For like reasons, nulls form in the directivity patterns of arrays 803 and 804 in the direction of the other subscriber arrays, and main lobes form in the direction of the central array. Separate adaptive beamformers are connected to central array 801 to provide communications with each of the subscriber arrays. Adaptive beamformer 807 communicates two-ways with adaptive beamformer 810, and so forth. The directivity pattern 815 shown in FIG. 16 is that of adaptive beamformer 806, resulting from communication with array 803. Two other directivity patterns, for adaptive beamformers 805 and 807, are not shown in the figure. The nulls in one of the three directivity patterns of the central array allow communication between this array and the array of the selected subscriber, without radiating the transmitted signal toward the other subscribers and interfering with them. Three separate directivity patterns are needed for the central array to independently communicate with the three subscribers. The transmitted signals of each of the subscribers are not received by the other subscribers because of the nulls in their directivity patterns. Thus, the subscribers do not interfere with each other. The adaptive beamformers connected to the central array communicate with their respective selected subscriber adaptive beamformers also without interference.

Figure 17:
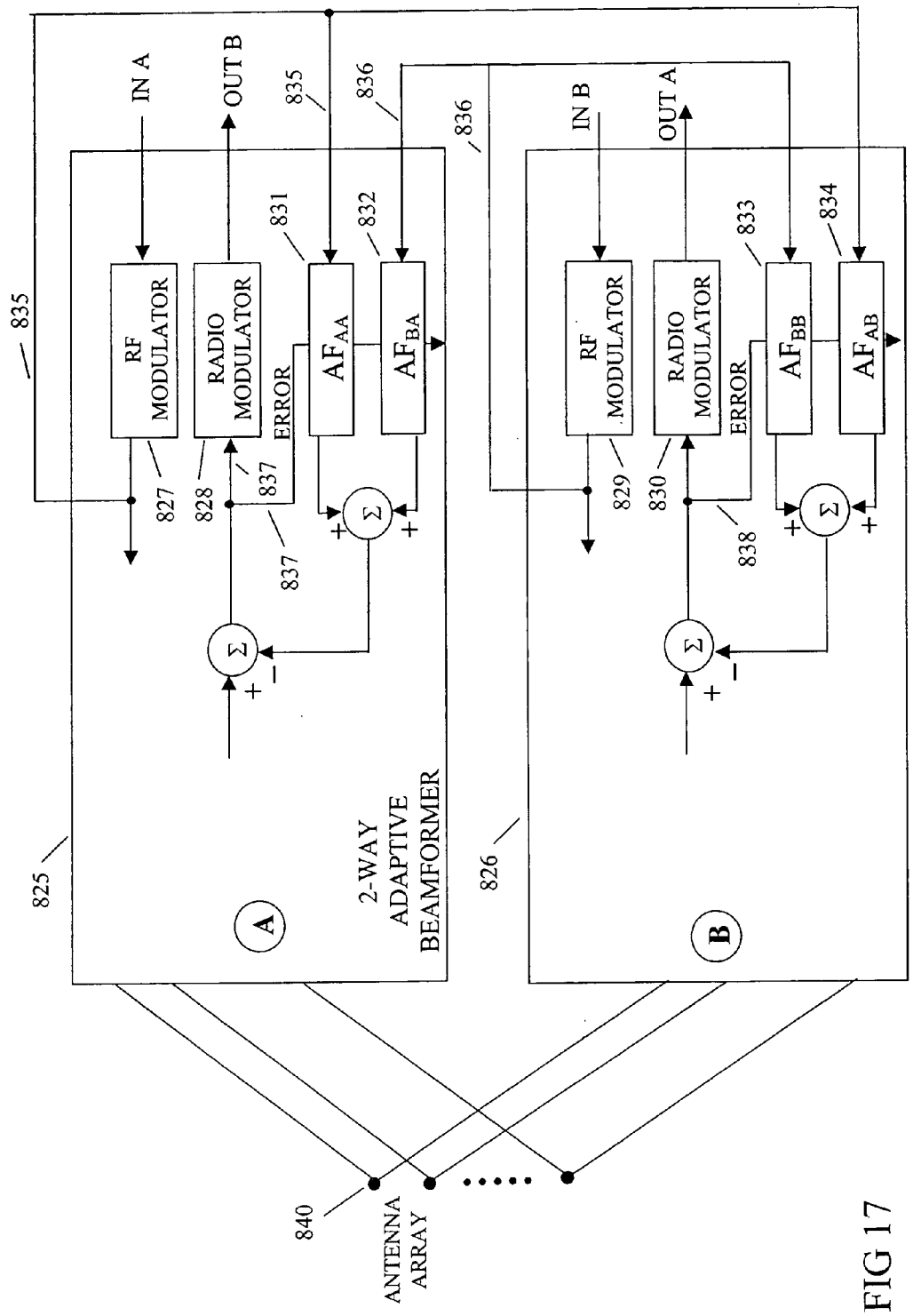
FIG. 17 shows a scheme for canceling many simultaneously transmitted signals from the inputs of a bank of receivers at the central adaptive beamformer site.

There is one question that remains, about the three transmitters in the three beamformers 805, 806, and 807, all transmitting through the same central array 801 while their respective receivers are simultaneously receiving. Each receiver must have each of the transmitted signals removed from its input. FIG. 17 shows how this would be done for the case of two 2-way adaptive beamformers operating with the same antenna array 840.

Referring to FIG. 17, radio receiver 828 of adaptive beamformer 825 has signals from its own RF modulator 827 removed from its input 828 by the action of adaptive filter 831, and from the RF modulator 829 by the action of adaptive filter 832. Both of these adaptive filters adapt to minimize the mean square of the common error signal 837, which is the input of radio receiver 828. By minimizing this error, the transmitted signals leaking back into the radio receiver are removed. The same result is obtained within the 2-way adaptive beamformer 826, and would be obtained within any other adaptive beamformer connected to antenna array 840. The same method would be used to cancel the transmitted signals from the radio receiver inputs. This would need to be done with the 2-way adaptive beamformers 805, 806, and 807, shown in FIG. 16.

FIG. 16 shows a central array communicating with a cluster of three subscribers. One frequency band would be used for this instead of six bands. The utilization factor for the band is six fold. If a cluster of 10 subscribers were communicating with a central array, the utilization factor would be 20, and so forth.

This 2-way adaptive beamformer scheme could be used with signals having a variety of modulation types, such as TDMA, CDMA, etc. Whatever efficiency that they achieve in the spectrum usage, the rate of data transmission would be multiplied by the above utilization factor.

A directional coupler like the one used in FIG. 6B could be included in the 2-way terminus circuit of FIG. 2A, and this could enhance the performance of this circuit and that of the 2-way repeater circuit of FIG. 3A that is based on it. FIG. 7A shows a 2-way terminus device using a directional coupler 201 together with an adaptive filter 204. The 2-way terminal of the directional coupler connects to transmission line 200. Its input terminal connects to impedance 202. Its output terminal connects to impedance 203. The adaptive filter will typically need more than a single weight. The impedance level of the directional coupler is chosen to be equal to the characteristic impedance of transmission line 200. Accordingly, the transmission line 200 connected to the directional coupler will be properly terminated with its characteristic impedance $R_c$. A symbolic diagram of the 2-way terminus 210 incorporating a directional coupler (or hybrid) with an adaptive filter is shown in FIG. 7B having the designation "DC" on the terminus 210.

When using 2-way terminus devices and 2-way repeater amplifiers in connection with coaxial cable networks and with other copper transmission circuits such as telephone lines, it is often convenient to power these devices with DC current carried by the cable and telephone transmission lines themselves. A way of doing this is shown in FIG. 8. A DC power supply 230 is located near 2-way terminus 90 and provides its power. The same supply is connected to the transmission line 53 through the inductor L, 232, providing a DC component of voltage on line 53. The 2-way terminus 90 is also connected to line 53 with capacitor C, 231. The capacitor C is an open circuit at DC, and no DC current flows into the 2-way terminus through it. At the high frequencies of signal input A, 50, capacitor C acts like a short circuit and provides a direct connection to cable 53. At these frequencies, inductor L, 232, acts like an open circuit and does not bypass the signal to ground. Further along line 53, at the location of the first 2-way repeater amplifier, the line is connected to a DC regulator 235 through inductor L, 236. The regulator supplies power to the 2-way terminus devices 91 and 92. The DC voltage on line 53 is received by the regulator since the inductor L, 236, is essentially a short circuit at zero frequency. At high frequency, it acts like an open circuit and does not bypass the high frequency signals to ground. The capacitor C, 237 blocks the DC voltage of line 53 from entering the 2-way terminus 91. The inductor L, 239 serves as a DC bridge across the 2-way repeater, applying a DC voltage to transmission line 54. Capacitor C, 240, blocks this DC voltage from the input of the 2-way terminus 92. At signal frequencies, the capacitor acts like a short circuit, making a direct high-frequency connection to line 54. If there were a second 2-way repeater further along the line, it would be wired in the same way as the first 2-way repeater, and so forth. At the end of the line, 2-way terminus 93 is wired with inductor L, 251, connected to pass DC and block signal frequencies, and capacitor C, 250 is connected to block DC and pass signal frequencies as was done at the other end of the line. A DC regulator 252 receives the DC voltage from line 54, and supplies power to the 2-way terminus 93.

The DC power supply 320 could alternatively be connected through an inductor L to any point on the line to supply DC power to all of active devices in the system, all along the line. The same principles would be used to insure DC continuity along the line, proper DC supply voltages to the active devices, and solid high-frequency connections between the active devices and the transmission lines.

Figure 9:
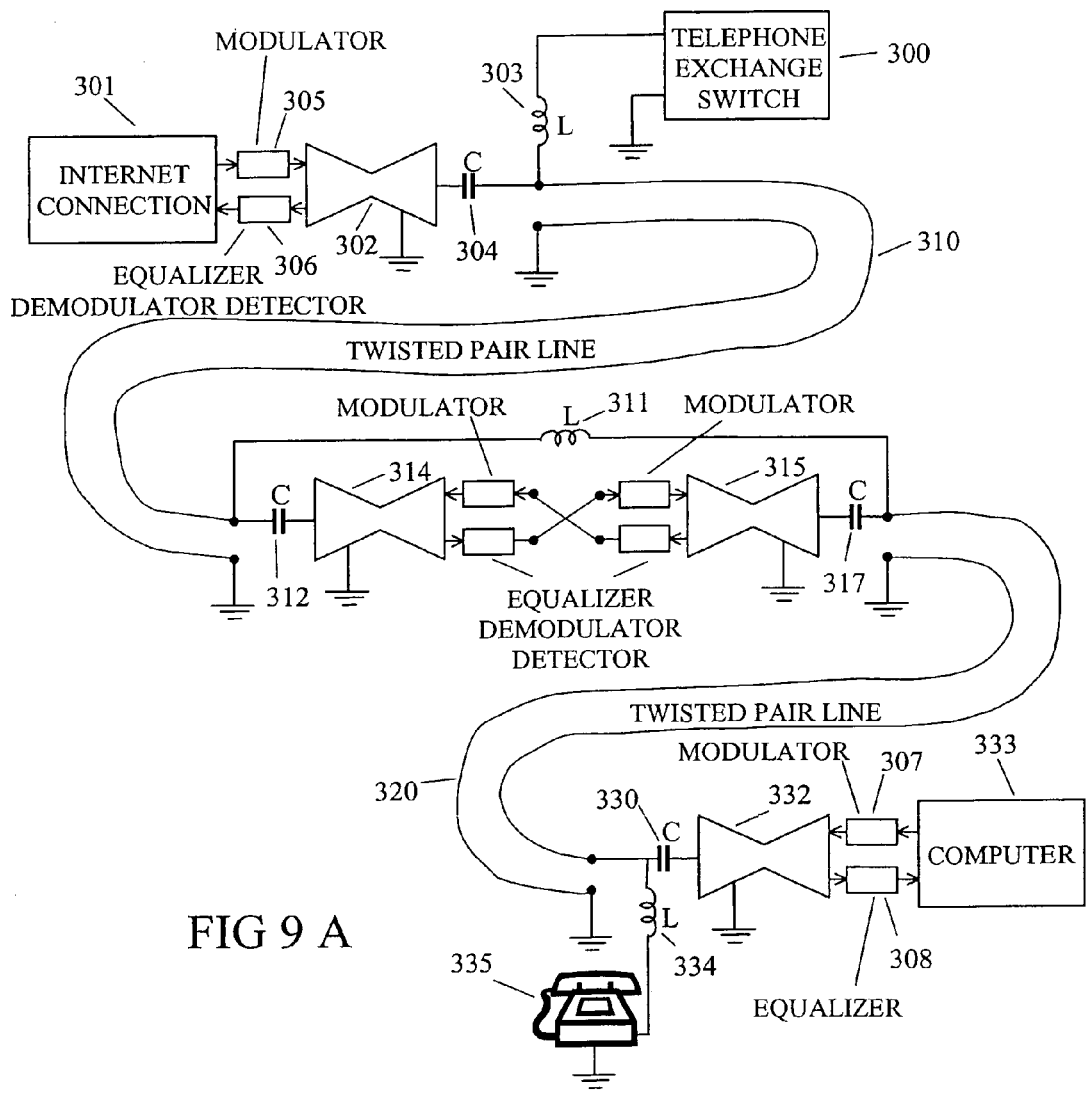
FIGS. 9A–9B show DSL (digital subscriber line) systems that allow high-speed internet service in both directions and in the same frequency band over a twisted-pair telephone line while at the same time providing ordinary telephone service over the same telephone line, with the high-frequency DSL signals separated from low-frequency telephone signals in one case by means of capacitors and inductors, or by means of telephone splitter devices.
Figure 9:
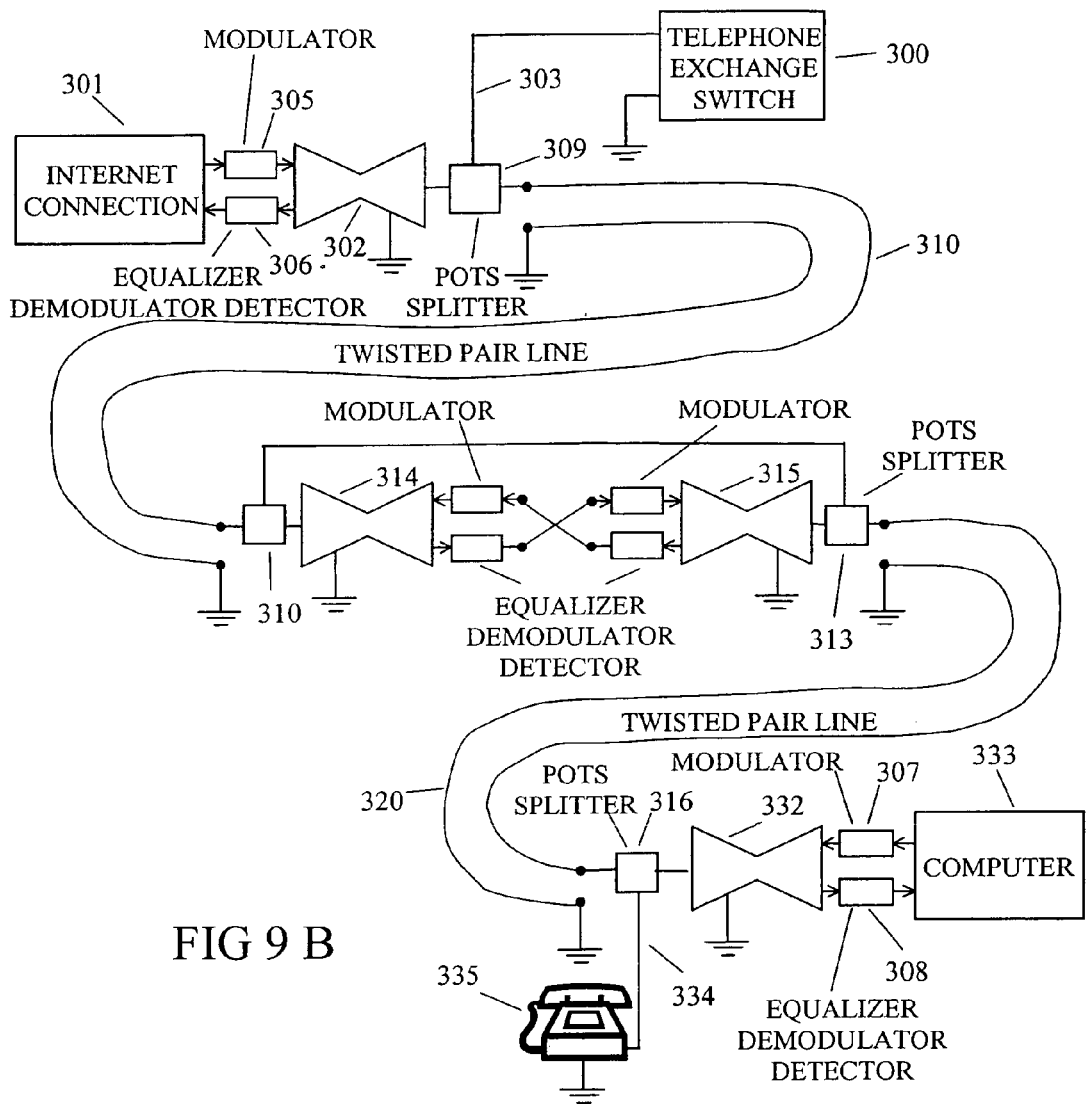

A wideband Internet service over conventional twisted-pair telephone lines known as DSL (digital subscriber line) could benefit from the two-way communication methods of the present invention. Conventional DSL uses different frequency bands for the two directions. An increased bandwidth would result from transmitting two ways in the same band of frequencies at the same time. FIGS. 9A and 9B show means for doing this.

Conventional DSL uses the telephone line for two different purposes. At low frequencies, up to about 3 kHz, the line is used for "dial-up" telephone service in the usual way. At higher frequencies, the line is used for constant high-speed Internet connection. The circuits of FIGS. 9A and 9B do all of this except that they effectively double the transmission rate of the Internet connection.

In FIG. 9A, the telephone line 310 is connected to the telephone exchange switch 300 through inductor 303. The inductor passes the low frequency telephone signal to line 310. Further along line 310, there may be a 2-way repeater to compensate for line signal loss. The low frequency telephone signal bypasses the repeater through inductor 311 and connects to the line 320. The conventional touch-tone or dial telephone 335 connects to line 320 through inductor 334. Thus at the low frequencies of the telephone signal, telephone 335 is connected to the telephone exchange switch 300 and operates in a normal way. Dial tone and the ringing signal are carried over this path in the usual way.

The high-frequency Internet signals are superposed on lines 310 and 320 through capacitors 304, 312, 317 and 320. These capacitors are open circuits at the telephone signal frequencies, but act as short circuits at the digital Internet signal frequencies. The internet connection 301 couples in both directions through DSL modulator 305 and through DSL equalizer, demodulator, and detector circuit 306 to the telephone line 310 through the 2-way terminus 302 and through capacitor 304. The internet signal couples through the 2-way repeater to line 320. Inductor 311 is an open-circuit to the internet signal. The internet signal couples in both directions through DSL modulator 307 and through DSL equalizer, demodulator, and detector circuit 308 to computer 333 through capacitor 330 and the 2-way terminus 332. The inductor 334 keeps the internet signal away from telephone 335. The computer 333 is in constant two-way communication with the Internet, without experiencing any interference from the telephone operation. Likewise, the telephone can be used normally while the computer is logged into the Internet.

In FIG. 9B, the coupling capacitors and inductors that are used in FIG. 9A to separate the high-frequency DSL signals from the low-frequency telephone signals are is replaced by frequency-sensitive directional couplers used in conventional DSL systems called POTS splitters. They split the "plain old telephone signal" (POTS) from the DSL signal. FIG. 9B shows how these directional couplers can be connected to provide two-way internet and telephone service over the same telephone line.

The circuits of FIGS. 9A and 9B perform equivalently. The 2-way repeater amplifier can be omitted for short distances, of the order of one, to two miles. For longer distances, one or more repeaters should be used. With 2-way repeater amplifiers inserted as required, DSL signals can be transmitted over a twisted pair telephone line over very long distances . This cannot be done with conventional DSL.

DC power is generally supplied to the telephone instrument by the telephone exchange switch. This power can be used to supply all of the 2-way terminus units from the telephone line by combining the techniques of FIG. 8 with those of FIGS. 9A and 9B, as would be done by one skilled in the art.

The range of DSL can be extended by using 2-way repeater amplifiers, as many as would be required to compensate for line loss and noise. This overcomes a limitation of conventional DSL since DSL cannot serve over very great distances from the telephone exchange switch. If many repeaters are to be used along the line, the systems of FIGS. 9A and 9B could be used to insure very low bit error rates in transmission. The modulator circuit and the equalizer, demodulator, detector circuit would be standard types used with DSL signal format. Doubling the bandwidth of DSL transmission could be very advantageous, particularly when transmitting two-way video during a teleconference.

Present day DSL systems use standardized signal formats and are implemented with chip-sets and circuits that are designed to work with these standards. It is possible to utilize the technology of the present invention together with the existing DSL circuits and hardware and thereby enhance the overall system performance, without requiring a complete redesign of DSL technology.

Figure 12:
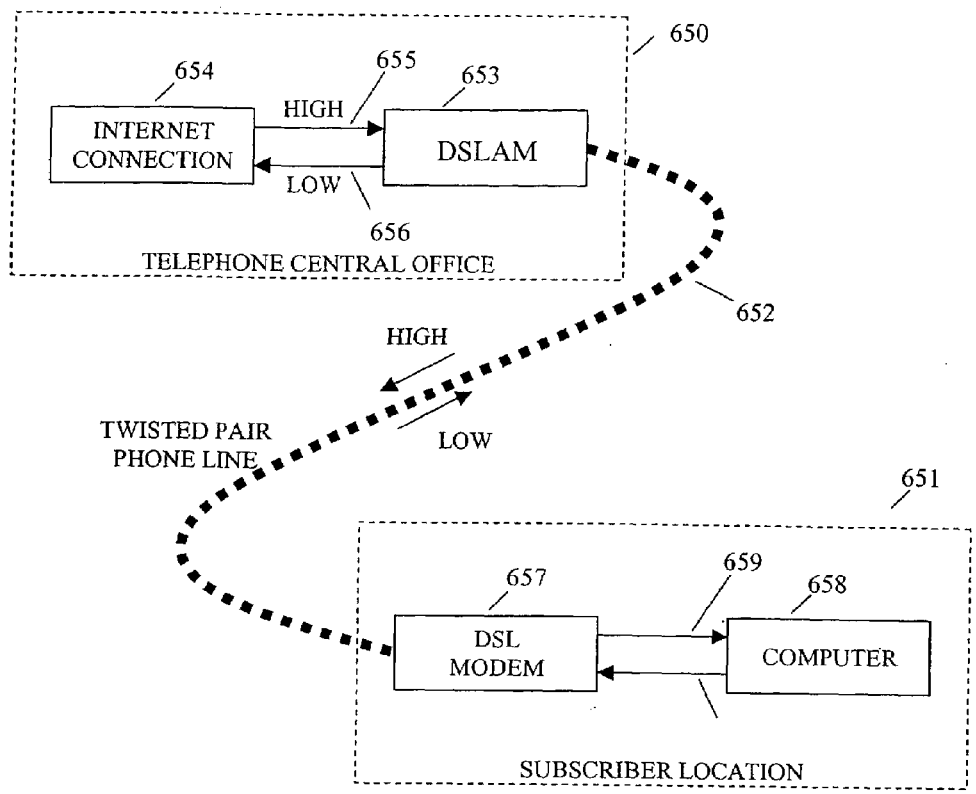
FIG. 12 shows an asymmetrical DSL (ADSL) hookup, simplified by omitting the telephone circuits (prior art)

Asymmetrical DSL or ADSL is the prevalent form of DSL at the present time. Approximately 90% of the channel bandwidth is dedicated to "download" transmission from the internet to the subscriber's computer and 10% of the channel bandwidth is used to "upload" from the subscriber's computer to the internet. Low frequencies low bandwidths are generally used for downloading, while high frequencies and wider bandwidths are used for uploading. A block diagram illustrating the existing art of ADSL is shown in FIG. 12. The circuits that provide telephone service are not shown in this simplified diagram.

The objective is to increase the data rate for uploading and make it the same as for downloading. This could be done by sharing the channel bandwidth equally for transmission in both directions. But this would almost halve the download speed, a most undesirable effect. The goal is to allow full-speed data transmission in both directions simultaneously, using a single telephone line. This can be done using standard signal formats and standard electronic circuits, with the addition of 2-way terminus devices and certain other circuit components. In operation, fast 2-way data transmission would make applications such as 2-way video over the internet more practical.

Referring now to FIG. 12, at the telephone central office 650, an internet connection is made to a subscriber's telephone line 652 through a DSLAM 653, where DSLAM is an acronym for DSL access multiplexer. The DSLAM provides a 2-way connection to the internet. A high-speed download connection 655 is shown, as well as a low-speed upload connection 656. The low-speed connection has about one tenth the data rate of the high-speed connection. The high-speed connection therefore has about ten times the bandwidth of the low-speed connection, and the frequency band for the high-speed connection is separate and higher than the frequency band for the low-speed connection. These signals are coupled to the telephone line and travel in different frequency bands in the two directions. On the other end of the phone line at the subscriber location 651, a computer 658 transmits and receives simultaneously through the phone line by coupling to it with the DSL modem 657. The DSLAM and the DSL modem perform similar functions except that the DSLAM is configured to transmit at high speed and receive at low speed, while the DSL modem is configured to receive at high speed and to transmit at low speed.

Figure 13A:
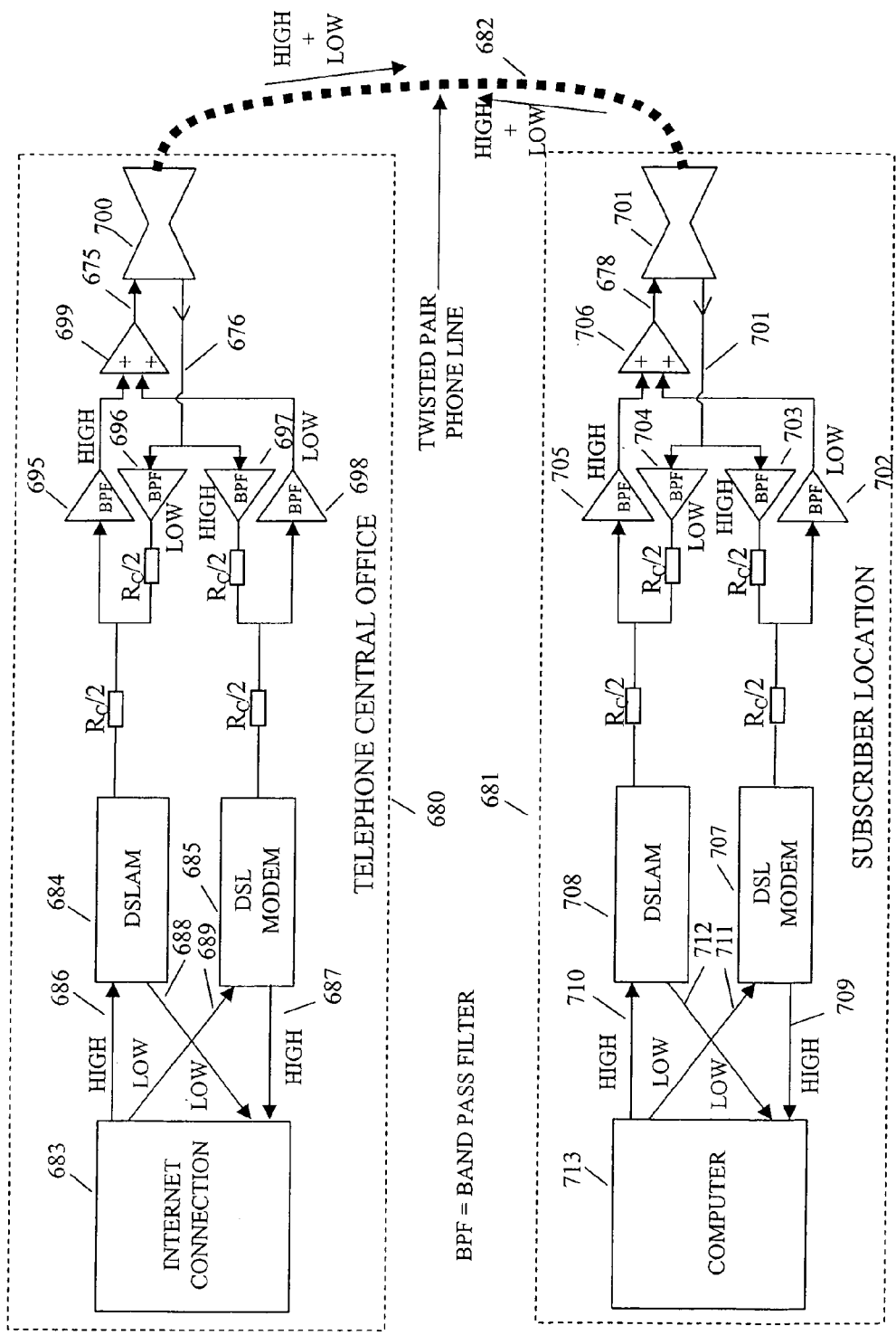
FIG. 13A shows a symmetrical DSL hookup using 2-way terminus devices, band pass filters and resistor networks and standard ADSL hardware and signal formats to couple a telephone line to the internet at one end and to couple the telephone line to a subscriber's computer at the other end, allowing both download and upload speeds to be equal to the ADSL standard download speed plus the ADSL standard upload speed.

Referring now to FIG. 13A, a symmetrical DSL system is shown that provides high-speed connection in both directions between the internet and a subscriber's computer. The telephone line 682 provides a 2-way connection between the telephone central office 680 and the subscriber location 681. Signals of both the DSL high band and the DSL low band travel simultaneously in both directions over channel 682. With ADSL on the other hand the low-band signals travel in one direction (from the computer to the internet), while the high-band signals travel in the other direction (from the internet to the computer). How the system of FIG. 13A functions can be explained as follows. We begin at the central office 680. Both a DSLAM 684 and a DSL modem 685 are connected to the internet, downloading through high-bandwidth connection 686 and low-bandwidth connection 689, while uploading through high-bandwidth connection 687 and low-bandwidth connection 688. The total download speed and the total upload speed are thus the sum of the download and upload speeds of conventional ADSL. The DSLAM and the DSL modem connect to a network coupling and line terminating resistors, and band pass filters 695, 696, 697, and 698. The bandpass filters pass either the high-bandwidth signals or the low-bandwidth signals, as indicated. High-bandwidth and low-bandwidth download signals are summed by operational amplifier 699 and applied to 2-way terminus 700 by the connection 675. High-bandwidth and low-bandwidth upload signals arrive from the 2-way terminus 700, and connect via line 676 to low-bandwidth and high-bandwidth band pass filters 696 and 697, and thereby through a network of resistors to the DSLAM and the DSL modem. The band pass filters and resistors provide proper line termination impedances for the DSLAM and the DSL modem, and provide coupling between the DSLAM and DSL modem and the 2-way terminator 700. They prevent uploading signals on line 676 from leaking into the downloading path 675. The 2-way terminus couples the uploading signal path 676 and the downloading signal path 675 to the telephone line.

The circuits at the subscriber location 681 work in the same way as at the telephone central office 680, only in reverse order. It should be clear to one skilled in the art that variations in these circuits would be possible, yet the same system functions as described above could be realized. For example, another approach, illustrated in FIG. 13B, eliminates the band pass filters and the resistor networks, and substitutes 2-way terminus devices in their place. The phone line 682 carries independent low plus high bandwidth signals in both directions between the internet connection 683 and the computer 713. At the telephone central office 680, the phone line connects to the 2-way terminus 700 which separates the received signal 676 from the transmitted signal 675. The received signal is inputted to 2-way terminus devices 714 and 715. They output this to DSLAM 684 and DSL modem 685. The DSLAM is designed to respond only to the low frequency, low bandwidth line signal, and it outputs a demodulated low bandwidth bit stream 688 to the internet connection 683. The DSL modem in turn is designed to respond only to the high frequency, high bandwidth line signal, and it outputs a demodulated high bandwidth bit stream 687 to the internet connection 683. Thus, the internet connection receives both bitstreams, the high bandwidth and the low bandwidth. These bitstreams correspond respectively to the high and low bandwidth bitstreams, 710 and 711, transmitted from the computer 713 at the subscriber's location 681. This computer's total upload bitstream is assumed to be broken into bitstreams 710 and 711.

At the telephone central office 680, the total bitstream downloaded from the internet is assumed to be broken in to two bitstreams, the high bandwidth one 686 and the low bandwidth one 689. Bitstream 686 is inputted to the DSLAM and it transmits a modulated high bandwidth wave to 2-way terminus 714, which in turn, outputs this same signal to the summer 699. Bitstream 689 is inputted to the DSL modem and it transmits a modulated low bandwidth wave to 2-way terminus device 715, which in turn, outputs this same signal to summer 699. The output of this summer is a low-plus-high bandwidth signal that is inputted to 2-way terminus 700. This terminus connects to the phone line and imparts a low-plus-high bandwidth wave in the direction toward the subscriber. The circuits at the subscriber location work in the same way as at the telephone central office, only in reverse order.

Figure 10:
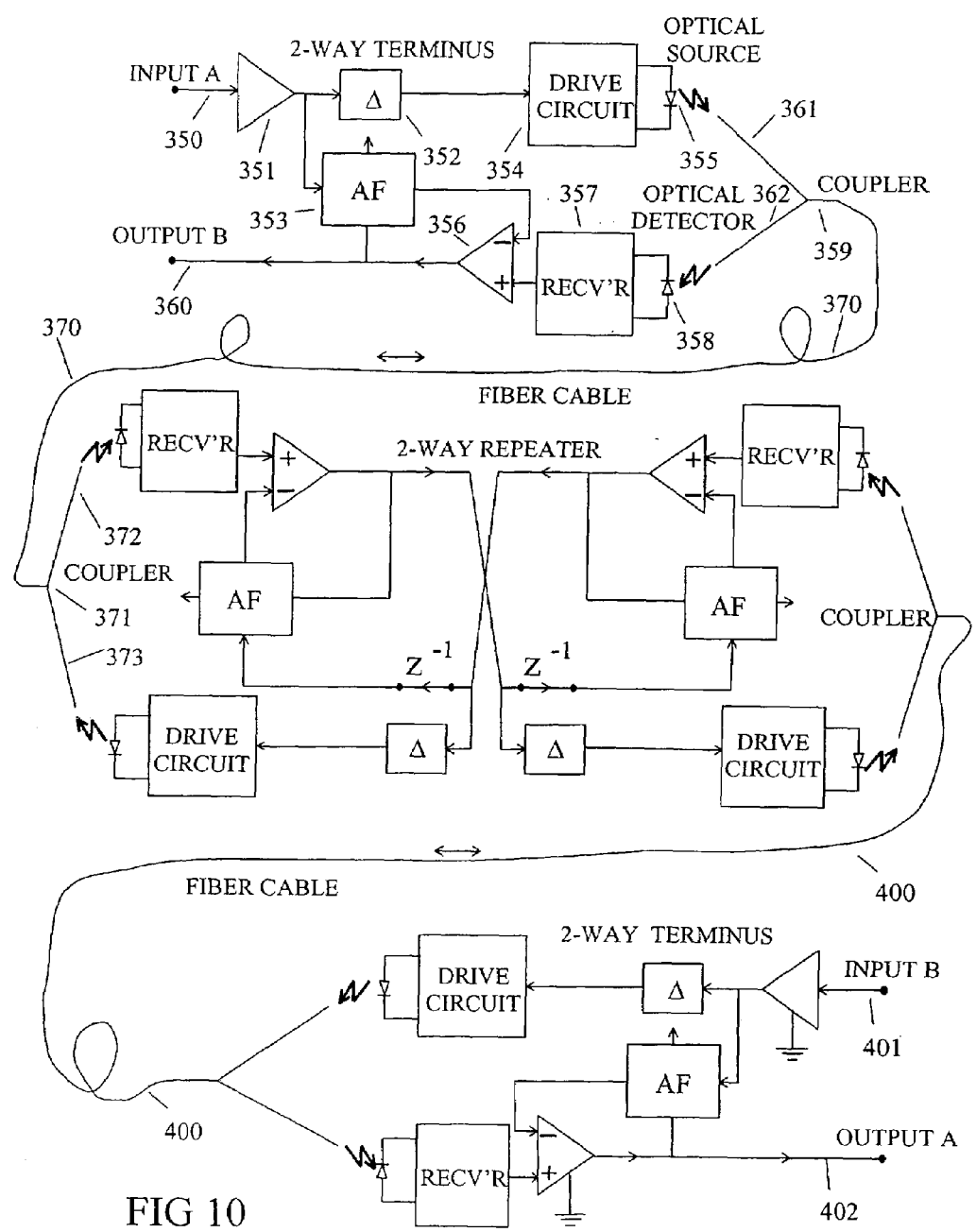
FIG. 10 shows a two-way fiber-optic transmission system, each end of the transmission line having a 2-way terminus that converts signals from electronic to optical and optical to electronic, and having a 2-way repeater amplifier in the middle of the line that also converts signals from optical to electronic and from electronic to optical.
Figure 13B:
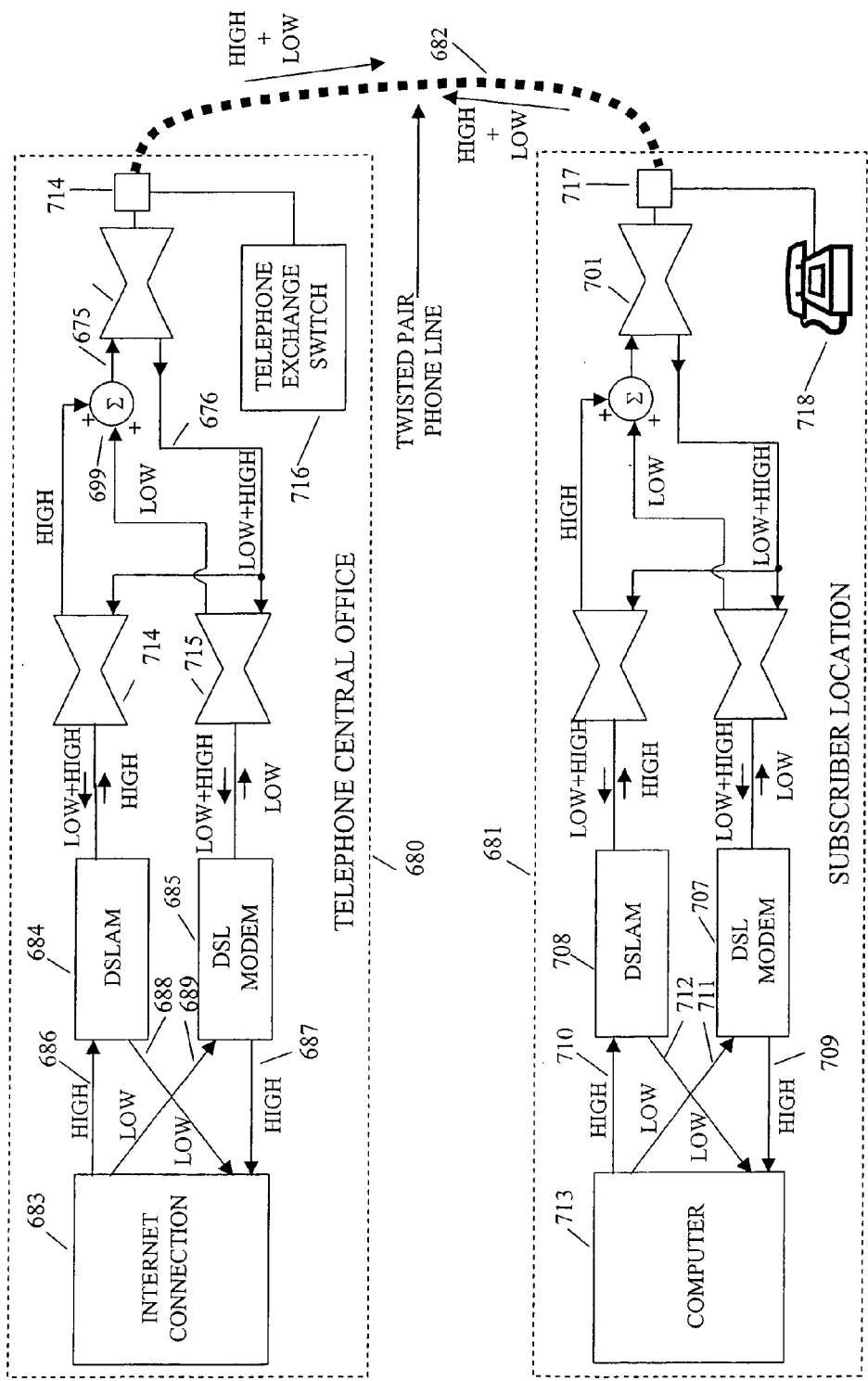
FIG. 13B shows another symmetrical DSL hookup using three 2-way terminus devices at each end of the telephone line and standard ADSL hardware and signal formats to couple the subscriber computer to this line and to couple this line to the internet, allowing both download and upload speeds to be equal to the ADSL standard download speed plus the ADSL standard upload speed.

Using either the circuit of FIG. 13A or that of FIG. 13B, one obtains more than full speed data transmission between the internet and a subscriber's computer in both directions at the same time. Use is made of standard signal formats and existing hardware, plus 2-way terminus devices and other circuit components. Although the explanation of these circuits has been given in the context of DSL communication, the same circuits work for cable modem systems as well. Symmetrical high-speed 2-way communication over cable networks is obtained with these methods. Wideband fiber optic systems would also benefit from two-way simultaneous transmission in the same frequency band. FIG. 10 shows a fiber optic transmission system having 2-way terminus units at its ends, and if needed to compensate for transmission loss, a 2-way repeater in between. For very long transmission lines, more 2-way repeaters would be installed along the line. For short transmission lines, typically shorter than 50 km, repeaters would not be needed. The line would simply be a fiber cable with 2-way terminus units at its ends.

The optical transmission system of FIG. 10 works in a manner similar to that of the transmission system of FIGS. 3A and 3B, but it differs in detail because it makes use of various opto-electronic components. At the top of FIG. 10, a 2-way terminus is shown whose purpose is to provide a means for injection of the baseband input A signal 350 into the transmission system and to receive from it the baseband output B signal 360. Input A drives amplifier 351 that drives the small delay Δ, 352, that in turn feeds an input signal to a drive circuit 354. The drive circuit modulates input signal A and amplifies the modulated signal to power optical source 355. This source could be a laser or light-emitting diode (LED). The light from the optical source drives a fiber cable 361 that connects to coupler 359. This injects a light signal representative of input A into the transmission fiber 370. In the other direction, signals coming from fiber 370 go to the optical detector 358 via the coupler 359 and a length of fiber cable 362 to detector 358. The detector is a photo diode. It connects to receiver 357 to provide an electrical signal to drive amplifier 356, whose output is output B, 360. The receiver amplifies and de-modulates to recreate the baseband output signal B.

When optical source 355 couples to the fiber cable 370 by means of coupler 359, a small amount of its light energy leaks through the coupler into fiber line 362 and from there to the optical detector 358. This is unfortunate, and it necessitates adaptive canceling of the leakage component at the output of receiver 357. This is done by adaptive filter 353 whose input comes from input A and whose output is subtracted from the receiver output by the difference amplifier 356. The error signal for the adaptive filter is output B, 360.

Two-way light signals are carried by fiber cable 370. If a 2-way repeater is used, optical signals are brought to it by fiber cable 370. At the repeater, coupler 371 delivers signal A via fiber 372 to an optical detector, and receives signal B from an optical source via fiber 373. The 2-way repeater consists of a pair of 2-way terminus units connected "back-to-back" by electrical means. This repeater is a symmetric device that connects to fiber cable 400 in the same way that it connects to fiber cable 370. As shown in FIG. 10, fiber cable 400 at its end connects to another 2-way terminus. This terminus couples an optical signal to fiber cable 400 that is representative of input B, 401, and extracts from fiber cable 400 a light signal that, when demodulated, yields output A, 402. This second 2-way terminus is identical in structure to the first 2-way terminus and works in the same way. The functioning of the electrical parts, the adaptive filters, the delay units, the differencing amplifiers, and the crisscross connections in the 2-way repeater is the same as for the system shown in FIG. 3A.

If the optical transmission system of FIG. 10 is carrying digital data signals, the receiver circuits (such as receiver 357) would contain demodulators, amplifiers and digital regenerator circuits. By regenerating the original baseband digital signal, signal-to-noise ratio is greatly improved. Having a low bit error rate is most important for transmission systems having many repeater units.

It is possible to construct a 2-way repeater having an all-optical information signal path, so that the optical signal would not need to be converted to electronic form, and then converted back to optical form. Amplification is done with laser amplifiers. An optical 2-way repeater is diagrammed in FIG. 11 that avoids optical-to-electronic conversion along the signal path.

Figure 11:
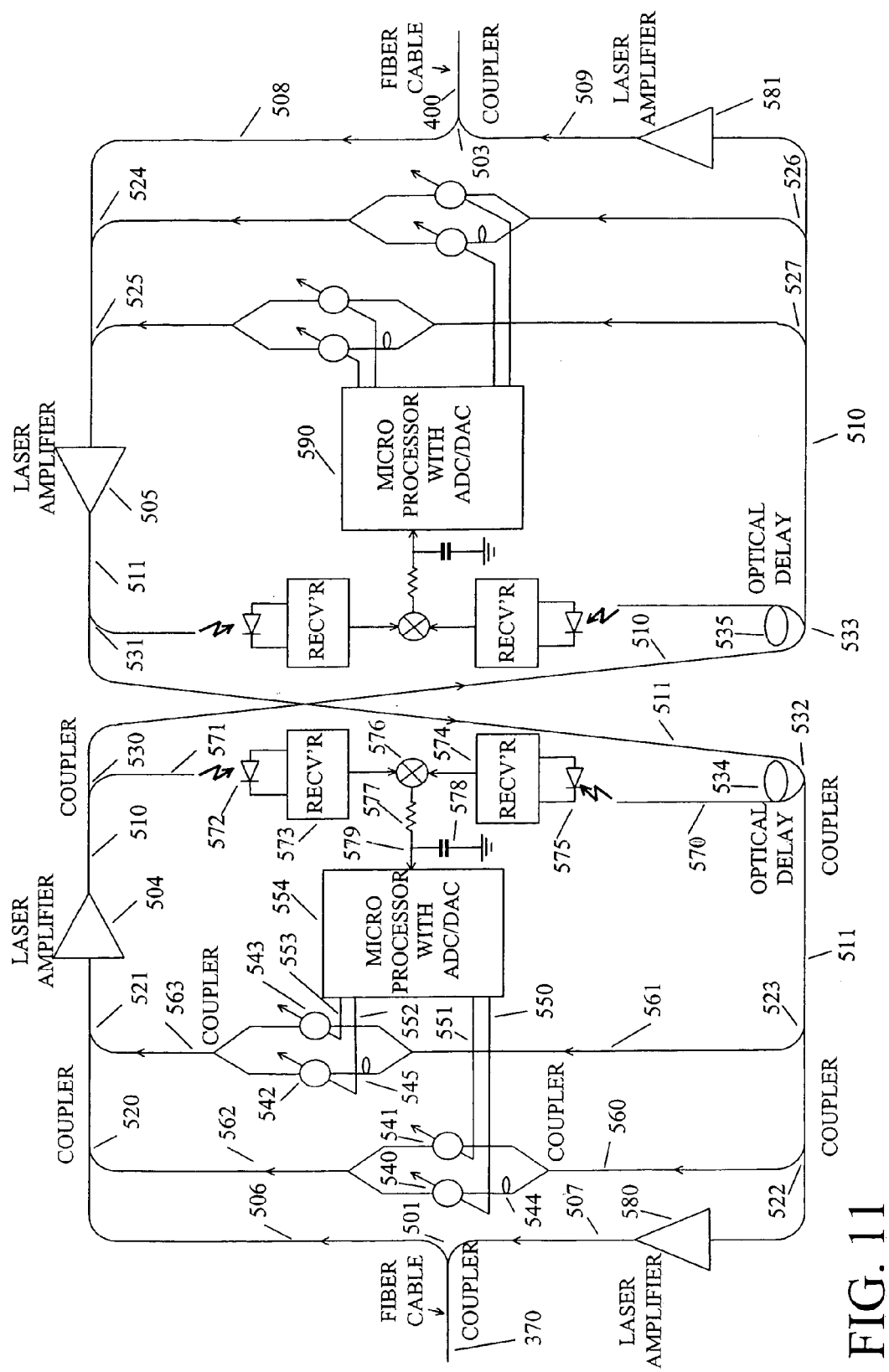
FIG. 11 shows a two-way fiber-optic transmission system, each end of the transmission line having a 2-way terminus that converts signals from electronic to optical and from optical to electronic, and having a 2-way repeater amplifier in the middle of the line whose signal path is all optical and avoids conversion of signals from electronic to optical and optical to electronic, and whose adaptive canceling filters have electronically controlled optical signal paths.

In FIG. 11, the 2-way repeater is connected on the left to fiber cable 370, and on the right to fiber cable 400. As with the 2-way electronic repeater shown in FIG. 10, signal A arrives via fiber cable 370 and departs via fiber cable 400, while signal B arrives via fiber cable 400 and departs via fiber cable 370. On the left, signal A couples to fiber 506 by means of the coupler 501. Signal A is amplified by laser amplifier 504, whose output signal travels on fiber 510 to laser amplifier 581. The output of laser amplifier 581 travels on fiber 509, through coupler 503, then onto fiber cable 400. In like manner, signal B arrives from fiber cable 400, couples through coupler 503 to fiber 508, drives laser amplifier 505, whose output travels on fiber 511 to laser amplifier 580, whose output couples to fiber cable 370 via fiber 507 and coupler 501. This describes the information signal paths of signals A and B. The laser amplifiers are designed to be unilateral in order to block unwanted reverse light paths.

Because of leakage in couplers 501 and 503, adaptive optical circuits are employed to provide cancellation of this leakage. Control of the adaptive circuits is exercised by microprocessors 554 and 579 based on correlation information related to the leakage.

Under operating conditions, laser amplifier 580 amplifies signal B and sends its output to fiber cable 370 by way of fiber 507 and coupler 501. Not all of the light couples to cable 370, however. With about a 30 dB reduction in amplitude, some of the light leaks through coupler 501 to fiber 506. Light signals from fibers 562 and 563 via couplers 520 and 521 respectively are added to the input of laser amplifier 504 to cancel the signal B leakage. The goal for laser amplifier 504 is to amplify signal A alone.

The leakage canceling circuits receive optical signal B from fiber 511 via couplers 522 and 523. The light signals travel on fibers 560 and 561 through couplers (splitters) to variable weight devices 540, 541, 542 and 543. The variable weight devices can be Mach-Zehnder interferometer modulators. These devices are well known in the fiber-optic communication literature. An excellent description is given by J. C. Palais, "Fiber Optic Communications", $4^{th}$ Edition, Prentice-Hall, Inc., Upper saddle River, N.J., 1984 (see page 97). Variable optical weight or gains are obtained by supplying the Mach-Zehnder interferometers with DC control signals 550, 551, 552, and 553 from digital-to-analog converters (DAC) connected to microprocessor 554.

A Mach-Zehnder device can be biased so that its optical gain is zero. Adding a positive voltage to this bias will cause the gain to have a positive value approximately proportional to the positive voltage applied. Adding a negative voltage to this bias will cause the gain to have a negative value (the phase of the light output is shifted by 180°) whose magnitude is proportional to the magnitude of the negative voltage.

The Mach-Zehnder device 540 is fed an optical signal that is approximately 90° phase shifted from the optical signal that feeds device 541. The phase shift comes from light traveling through the optical delay 544. A 90° phase shift is best, but is not critical. It mainly needs to be different from a zero degree shift. The phase shift could also be an odd multiple of 90° or an approximation of this. The optical signals from weights 540 and 541 are summed by a coupler whose output drives line 562. By adjusting weights 540 and 541 under computer control, the light signal carried by fiber 562 can be made to have the correct magnitude and phase to cancel the leakage of signal B through coupler 501.

This works well if the transmission system were operating with light having a single wavelength. If the system were carrying light having two channels, i.e. two wavelengths, then the additional pair of weights 542 and 543 would be needed to cancel the leakage. For each additional optical wavelength used by the system, an additional pair of weights, two additional degrees of freedom, would be needed. It should be noted that the light path through fibers 561 and 563 and the weights 542 and 543 is made to be of different length than the corresponding light path through fibers 560 and 562 and the weights 540 and 541. If the path lengths were identical, only two degrees of freedom would be available for leakage canceling rather than four degrees of freedom. Two degrees of freedom are needed for leakage cancellation per wavelength being transmitted. Each independent variable weight provides one degree of freedom. As shown, the system of FIG. 11 works with optical signals having one or two wavelengths.

The microprocessor 554 has the job of controlling weights 540, 541, 542 and 543. The weights are adjusted to minimize a crosscorrelation signal 579, inputted to the computer through its analog-to-digital converter (ADC). The crosscorrelation signal 579 is the product of two baseband signals multiplied by multiplier 576 and averaged by a low-pass filter consisting of resistor 577 and capacitor 578. The baseband signals were amplified and detected by receiver 573 and 574. The inputs to the receivers came from optical detector 572 and 574.

The optical inputs to the optical detectors come from laser amplifier 504 via fiber 510, coupler 530, and fiber 571, and from laser amplifier 505 via fiber 511, coupler 532, the optical delay (a loop of fiber) 534, and fiber 570. If laser amplifier 504 carries only signal A, and laser amplifier 505 carries only signal B, and since signal A and signal B are independent of each other, the crosscorrelation signal 579 would be zero. If there were leakage at coupler 501, then laser amplifier 504 would be amplifying signal B components along with signal A and the crosscorrelation signal would be non-zero. The only way to make the crosscorrelation zero would be to adjust the weights to cancel the leakage. Note that the length of the optical delay 534 should be chosen so that the optical delay time from coupler 532 to optical detector 575 would balance the optical delay time from coupler 532 through fiber 511, laser amplifier 580, fiber 507, coupler 501, fiber 506, laser amplifier 504, fiber 510, coupler 530, fiber 571, to optical detector 572. The delay balancing is not critical. The timing needs only to be optimized from the point of view of time alignment of the baseband signals, not to within a fraction of the time period of the optical carrier frequency. With this time alignment, the magnitude of the crosscorrelation signal is a quadratic function of the weight values. A unique optimal choice for the weight values exists that corresponds to perfect cancellation of the leakage of signal B originating at coupler 501.

The weights of the adaptive optical circuits, once converged, would only need to change slowly over time to keep up with effects of temperature changes and ageing of components. The microprocessor can therefore be slow and inexpensive.

Several adaptive algorithms could be implemented by microprocessor 554 to adjust the weights. One algorithm based on a relaxation method would begin by slowly slewing one of the weights, say 540, in a given direction while sensing the magnitude of the crosscorrelation function. If this magnitude goes down, the slewing should continue until the magnitude begins to get larger, then stop. If the magnitude got larger at the outset, reverse the slewing direction and go until a minimum of the magnitude is reached. Then go to the next weight, say 541, and adjust it to minimize the magnitude of the crosscorrelation function. Adjust the next weight, and then the next one, and so on, each adjustment done by slewing to minimize the magnitude of the crosscorrelation function. When all of the weights have been adjusted, repeat the process by starting with the first weight again, and so forth. The process is repeated indefinitely in order to achieve convergence and, in steady state, to maintain balance and proper adjustment of the canceling circuit in the face of temperature changes and component ageing. On the other side of the 2-way repeater, microprocessor 590 determines in like manner the weights that cancel the leakage of signal A originating at coupler 503.

Other adaptive algorithms that can be used for adjusting and optimizing the weights of the 2-way repeater of FIG. 11 are based on genetic algorithms. A textbook describing genetic algorithms is J. R. Koza, et. al., "Genetic Programming III", Morgan Kaufmann Publishers, San Francisco, Calif., 1999. One form of genetic operation called "mutation" would have microprocessor 554 make random changes in weights 540, 541, 542 and 543 and check the autocorrelation signal 579. If the autocorrelation increases, remove the changes and restore the weight values. Then make another set of random changes to the weights. If the autocorrelation diminishes, keep the changes, otherwise remove them. Then make another set of random changes. And so forth. The process should be repeated indefinitely, always trying to improve performance. The same process would be implemented by microprocessor 590 to control the rest of the weights.

Another form of genetic operation of genetic algorithms called "crossover" could be used to adapt the weights of the 2-way repeater. All of the weights would be represented as binary numbers that would be concatenated into a large binary number. Some of the bits chosen at random would be complemented, and from this and the original binary number, two "parent" binary vectors are created. By mating the parents many times, many offspring are created some of whose bits come from one parent and some from the other. For each of the offspring, the weights of the 2-way repeater are set and the autocorrelation is observed. A pair of offspring is selected having the smallest autocorrelation. They then breed the next generation, and so on. The objective is to continually improve performance by selecting weights values that minimize the autocorrelations. Genetic algorithms generally converge more slowly than the relaxation algorithm, but they are easier to implement. Many other algorithms can be also be used to adapt the weights to minimize the autocorrelations. The microprocessors that control the weights need not be fast ones. They only need to be able to keep up with slow changes in the optical paths and optical components due to temperature changes and ageing.

The above description is based on preferred embodiments of the present invention; however, it will be apparent that modifications and variations thereof could be effected by one with skill in the art without departing from the spirit or scope of the invention, which is to be determined by the following claims.

What is claimed is:

1. A 2-way terminus device, based on adaptive filtering, for connecting both a signal source and a signal receiver to an end of a cable or wire channel for simultaneous transmission and reception of data signals in the same frequency band in said cable or wire channel, comprising:
   (a) a signal source and a first isolation amplifier, and an adaptive filter whose input is connected to said signal source through said first isolation amplifier,
   (b) a difference amplifier, and a connection between the output of said adaptive filter and the negative input of said difference amplifier,
   (c) a connection between said cable or wire channel and the positive input of said difference amplifier, connected to an output terminal to provide a connection to said signal receiver, the output of said difference amplifier, being the received signal,
   (d) a connection between the output of said difference amplifier and the error signal input of said adaptive filter,
   (e) a connection between the output of said first isolation amplifier and a small signal delay unit Δ whose output provides an input to a second isolation amplifier, said second isolation amplifier having the capability for signal amplification while driving a low impedance load, said delay unit having delay ranging from zero to the time duration of the impulse response of said adaptive filter,
   (f) a connection between the output of said second isolation amplifier and a first terminal of an impedance whose impedance value is equal to the characteristic impedance of said cable or wire channel,
   (g) a connection between the second terminal of said impedance and the said cable or wire channel, thus providing a two-way signal connection between said 2-way terminus device and said cable or wire channel, and
   (h) an adaptive algorithm stored in and implemented by said adaptive filter for the purpose of minimization of the mean square of said error.

2. The 2-way terminus device of claim 1, wherein said input signal is digital, said output signal is digital, and said output of said second isolation amplifier is digital, and said adaptive filter is implemented in digital form, having a digital input signal, a digital error signal, a digital output signal, and having a sampling frequency or cycle frequency synchronized to that of the said input signal, the said output signal, and the said output of said second isolation amplifier.

3. The 2-way terminus device of claim 1, wherein said adaptive filter has:
   (a) an analog-to-digital converter to convert the analog input signal to a digital input signal,
   (b) an analog-to-digital converter to convert the analog error signal to a digital error signal,
   (c) a digital adaptive filter connected and configured so that its input signal is the said digital input signal, its error signal is the said digital error signal, and its output is a digital output signal, and
   (d) a digital-to-analog converter to convert said digital output signal to analog form to provide an analog output signal for the said adaptive filter.

4. A two way-wireless communication system for simultaneous transmission and reception of information signals in the same frequency band or in overlapping frequency bands comprising:
   (a) a radio transmitter, a radio receiver, and an antenna,
   (b) a coupling means such as a transformer, a directional coupler, or some other electric network for connecting said transmitter and said receiver to said antenna,
   (c) an RF modulator and a source of baseband signal to be transmitted, said baseband signal provided as the input to said RE modulator,
   (d) an RF power amplifier and a delay device for connecting the output of said RE modulator to said RF power amplifier serving as the transmitter, the delay time of said delay device being small, ranging from zero to the impulse response duration of said RF amplifier,
   (e) a connection between the output of said RF amplifier and said coupling means to couple the transmitter to said antenna,
   (f) a subtractive means, and a connection between said coupling means and the positive input of said subtractive means,
   (g) an adaptive filter,
   (h) a connection between the output of said RF modulator and the input of said adaptive filter,
   (i) a radio receiver, and a connection between the output of said adaptive filter and the negative input of said subtractive means, the output of said subtractive means connected to the input of said radio receiver,
   (j) a connection between the output of said subtractive means and the error input of said adaptive filter to provide an error signal for adapting said adaptive filter,
   (k) an adaptive algorithm or mathematical procedure implemented by said adaptive filter for adjusting its parameters for minimization of the mean square of said error signal, and
   (l) an output terminal of the radio receiver for outputting a received baseband signal.

5. A 2-way terminus device, incorporating a directional coupler and based on adaptive filtering, for connecting both a signal source and a signal receiver to an end of cable or wire channel for simultaneous transmission and reception of data signals in the same frequency band or in overlapping bands comprising:
   (a) a first isolation amplifier, and an adaptive filter whose input is connected to said signal source through said first isolation amplifier, (b) a difference amplifier, and a connection between the output of said adaptive filter and the negative input of said difference amplifier,
(c) a delay device, and a connection between the adaptive filter input and the input of a delay device, said delay device implementing a small signal delay whose duration could range from zero to the impulse response duration of said difference amplifier,
(d) a connection between the output of said delay device and the input of said second isolation amplifier,
(e) a first impedance device, and a connection between the output of said second isolation amplifier and the first terminal of said first impedance device whose impedance is equal to the characteristic impedance of said cable or wire channel, and a connection between the second terminal of said first impedance device and the input terminal of said directional coupler,
(f) a connection between the output terminal of said directional coupler and the positive input of said difference amplifier,
(g) a second impedance device, and a second impedance device, and a connection between the output terminal of said directional coupler and the first terminal of said second impedance device whose impedance is equal to the characteristic impedance of said cable or wire channel, and a connection between the second terminal of said second impedance device and ground,
(h) a connection between the 2-way terminal of said directional coupler and said cable or wire channel,
(i) a received output signal, and a connection between the output of said difference amplifier and a terminal for outputting said received output signal,
(j) a connection between the output of said difference amplifier and the error input terminal of said adaptive filter for providing an error signal for the adaptive filter, and
(k) an adaptive algorithm or mathematical procedure implemented by said adaptive filter for adjusting its parameters for minimization of the mean square of said error signal.

6. A signal or information transmission system providing wireless individual two-way communication paths between a central antenna array and a plurality of subscriber antenna arrays, all or most communication signals being in the same frequency band, the central array and the distant subscriber arrays all connected respectively to 2-way adaptive beamformers in order to create nulls in their directivity patterns in the directions of all sources of interference, said antenna arrays not transmitting to or receiving from said directions, said information transmission system comprised of:
(a) a central antenna array, a plurality of 2-way adaptive beamformers, at least one individual 2-way adaptive beamformer for each distant subscriber, each of said adaptive beamformers transmitting and receiving through connections with the antenna elements of said central antenna array, each of said 2-way adaptive beamformers comprising,
(1) a plurality of adaptive beamformers, whose number is equal to the number of antenna elements of said central antenna array,
(2) coupling devices connecting to each of said elements to the inputs of each of said adaptive filters, a summing device whose inputs are connected to the output of said adaptive filters, a first subtractive device whose positive input is the summed signal of said summing device, a radio receiver whose input signal is the output signal of said subtractive device, the output of said radio receiver being the received baseband signal, a baseband signal to be transmitted which is inputted to an RF modulator, the output of said RF modulator providing inputs to a plurality of controlled filters that correspond one for one to the said adaptive filters, the architecture and weight values of the controlled filters set to correspond at each moment of time, to the corresponding weights of the adaptive filters, a subtracting adaptive filter whose input signal is the output signal of the said RF modulator, whose output signal is inputted to the negative input of said first subtractive device, the output of said first subtractive device provided as the error signal for said subtracting adaptive filter, so that it can subtract the transmitted signal from the radio receiver input, a coded pilot signal generator for generating a pilot signal used while the 2-way adaptive beamformer is trained, said pilot signal inputted to the positive input of a second subtractive device, the output of said summing device connected to the negative input of said second subtractive device, the output signal of said second subtractive device provided as an error signal during training for all of the adaptive filters of said plurality of adaptive filters, a plurality of RF amplifiers to provide RF power for wireless transmission, the input signals for said RF amplifier are the corresponding output signals from said controlled filters, and connections between the output signals from said RF amplifier and the corresponding said coupling devices provide RF driving currents for the elements of the central antenna array,
(3) subtracting adaptive filters configured for canceling all transmitted signals of the central antenna array from the inputs of all of the radio receivers, the number of transmitters and the number of receivers equal to the number of distant subscribers,
(b) a plurality of distant subscriber antenna arrays each connected and configured as part of a system for the two-way communication with the central antenna array, each said system comprised of,
(1) a subscriber's array of antenna elements located away from the central antenna array,
(2) a 2-way adaptive beamformer connected to the antenna elements of said subscriber's array,
(3) an output terminal of the 2-way beamformers for outputting the received baseband signal and an input terminal of the 2-way beamformer for inputting the baseband signal to be transmitted, and
(4) a pilot signal generator used during training of subscriber's 2-way beamformers, said pilot signal being random, of finite length, and uncorrelated with all other pilot signals used in said information transmission system.

7. The signal or information transmission system of claim 6, wherein said central antenna array contains one or more antenna elements, and wherein each antenna array of said plurality of distant subscriber antenna arrays contains one or more antenna elements.

* * * * *